(12) United States Patent
Matsuki et al.

(10) Patent No.: US 6,261,489 B1
(45) Date of Patent: Jul. 17, 2001

(54) METHOD OF MANUFACTURING SKIN-CARRYING INTERNAL-MOLD EXPANSION MOLDED BODY OF SYNTHETIC RESIN AND METAL MOLD USED FOR THE SAME METHOD

(75) Inventors: Kiyoshi Matsuki, Nishinomiya; Yoriki Kakimoto, Settsu, both of (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/142,210

(22) PCT Filed: Jun. 27, 1997

(86) PCT No.: PCT/JP97/02272

§ 371 Date: Sep. 3, 1998

§ 102(e) Date: Sep. 3, 1998

(87) PCT Pub. No.: WO98/00287

PCT Pub. Date: Jan. 8, 1998

(30) Foreign Application Priority Data

Jun. 28, 1996 (JP) .................................................... 8-170298
Jul. 11, 1996 (JP) .................................................... 8-182355
May 21, 1997 (JP) .................................................... 9-130908

(51) Int. Cl.$^7$ ............................... B29C 44/06; B28B 7/36
(52) U.S. Cl. ...................... 264/45.4; 249/104; 249/114.1; 264/46.4; 264/266; 425/4 R; 425/812
(58) Field of Search ................................ 264/45.4, 46.4, 264/293, 266; 249/104, 114.1; 425/812, 4 R

(56) References Cited

U.S. PATENT DOCUMENTS 4,576,850 * 3/1986 Martens ................................ 428/156
4,919,388 * 4/1990 Koike et al. ...................... 249/114.1
5,348,983 * 9/1994 Sterzel .................................... 521/54
5,639,536 * 6/1997 Yamazaki et al. .................... 264/266
5,944,405 * 8/1999 Takeuchi et al. ....................... 362/31

FOREIGN PATENT DOCUMENTS

| 55-73532 | 6/1980 | (JP) . |
| 56-72936 | 6/1981 | (JP) . |
| 61-239934 | 10/1986 | (JP) . |
| 4-212851 | 8/1992 | (JP) . |
| 5-261819 | 10/1993 | (JP) . |

* cited by examiner

Primary Examiner—Allan R. Kuhns
(74) Attorney, Agent, or Firm—Wolf, Greenfield & Sacks, P.C.

(57) ABSTRACT

This invention relates to a method for producing cellular molded article in mold pattern of synthetic resin having surface skin which is used, for example, as an automobile interior trim material or the like and a mold pattern for producing thereof. This invention aims to provide a method for producing cellular molded article of synthetic resin having surface skin which has good production efficiency and which comprises that cellular molded article of synthetic resin obtained by cellular molding of expanded beads in which poor melt bonding does not occur and thermoplastic resin skin material united with this cellular molded article of synthetic resin which has excellent appearance without residing beads pattern on its surface, and a mold used for producing thereof. In so-called simultaneous united molding, at least the part of one mold part (5) on which thermoplastic resin skin material (3) is set is made of gas permeable metal mold, gas permeable ceramic mold or gas permeable electron casted mold (5d) having fine gas permeable holes of not more than 100 μm of diameter on the whole surface (5a) and at least during steam heating and before expanding expanded beads (8), one mold part (5) on which thermoplastic resin skin material (3) is set is made to be the upper part, and the other mold part (6) is made to be the lower part.

15 Claims, 26 Drawing Sheets

METHOD OF MANUFACTURING SKIN-CARRYING INTERNAL-MOLD EXPANSION MOLDED BODY OF SYNTHETIC RESIN AND METAL MOLD USED FOR THE SAME METHOD

TECHNICAL FIELD

This invention relates to a method for producing cellular molded article of synthetic resin with a surface skin which is used, for example, as an automobile interior trim material or the like and a mold pattern used for producing the above-mentioned article.

BACKGROUND OF THE INVENTION

As for the conventional method for producing cellular molded article of synthetic resin with surface skin of this kind, for example, (a) so-called simultaneous molding in once is known, in which thermoplastic resin skin material is set in any one of two mold parts, and after clamping the mold parts, expanded beads are charged in the molding chamber, and then expanded additionally for melt bonded together by steam heating, along with making melted bonding with the said thermoplastic resin skin material. In this method when the said two mold parts can be opened and clamped toward vertical direction, the said one mold part has to be the lower part to make setting of the said thermoplastic resin skin material easy.

(b) Moreover, in this simultaneous united molding, as shown in FIG. 28, it is common that the surface 5a of the said one mold part 5 is smoothed, and that the surface 3a of the said thermoplastic resin skin material 3 is made a mat processing with a prescribed roughness and performed to form fine and uniform unevenness 19. In this case, when after charging expanded beads 8 in the said molding chamber 7 and cellular molding these beads 8 by steam heating, the prescribed range D of the surface 3a of the said thermoplastic resin skin material 3 is pressed by the surface 5a of the said one mold 5 harder than the other range E by expanding force F of the said expanded beads 8 from the backside 3b.

Here, since the said thermoplastic resin skin material 3 is softened by steam heating, as shown in FIG. 29, the fine unevenness 19d which is even finer than the fine unevenness 19 formed in advance by mat processing is formed in the said range D which is pressed harder as above-mentioned. Also, the said the other range E is pressed against the surface 5a of the said one mold part 5 by the expanding force which is smaller than that pressing the range D. Therefore, the fine unevenness 19e which is about as fine as or a little finer than the fine unevenness 19 formed in advance by the said mat processing is formed in the other range E. However, the fine unevenness 19d in the said range D is finer as a result of being pressed harder against the surface 5a of the said one mold part 5, the range D appears as circular so-called beads pattern when looked over. This is disadvantageous as it deteriorates the appearance of the obtained cellular molded article of synthetic resin having surface skin 51.

(c) As the example of conventional method to solve such problem, the method in which, as shown in FIG. 30, laminated sheet 23 which comprises of thermoplastic resin sheet 53 whose surface 53a is formed to the fine unevenness 19 by mat processing and the thermoplastic resin extruded foam sheet 54 which is attached to the backside 53b of the thermoplastic resin sheet 53 is used as the said thermoplastic resin skin material 3, and the sheet 23 is set as the said thermoplastic resin sheet 53 surface will come in contact with the said one mold part 5 and the said thermoplastic resin extruded foam sheet 54 surface will come in contact with the said expanded beads 8, and other processes are the same as the above-mentioned is known.

In this method, when the said thermoplastic resin extruded foam sheet 54 is pressed from its backside 54b by expanding force F of the said expanded beads 8 at the cellular molding process of the said expanded beads 8, this thermoplastic resin extruded foam sheet 54 functions as so-called cushioning material. Therefore, it is hard for the pressing force F to work on the surface 53a of the said thermoplastic resin 53, consequently, the above-mentioned beads pattern does not appear.

(d) In addition to the above-mentioned simultaneous united molding, for example, the so-called afterward attached molding, in which cellular molded article of synthetic resin 2 and thermoplastic resin skin material 3 are set between two mold parts, and when clamping the mold parts and pressurizing them, these cellular molded article of synthetic resin 2 and thermoplastic resin skin material 3 are united by heat and/or adhesives is known.

In FIG. 31, the case when the said cellular molded article of synthetic resin 2 and thermoplastic resin skin material 3 are melt bonded and united by heat is shown. In this case, as the above-mentioned, it is common that the surface 15a of the one mold part 15 which will come in contact with the said thermoplastic resin skin material 3 is smoothed and that mat processing of a prescribed unevenness is more or less uniformly performed to form the fine unevenness 19 on the surface 3a of the said thermoplastic resin skin material 3. On the other hand, it is not common that the surface 2a of the said cellular molded article of synthetic resin 2 is smoothed. Also the case of uniting cellular molded article of synthetic resin 2 with thermoplastic resin skin material 3 by adhesive existing between them without heat, or the case of uniting by both heat and adhesive is in similar conditions as above-mentioned.

However, in the conventional example of above-mentioned (a), since the expanded beads are expanded by the said steam heating, drain (moisture) may remain in the said molding chamber during this steam heating process and before expanding process of the said expanded beads. Therefore, the disadvantage is that this remaining drain causes poor melt bonding of the expanded beads in the cellular molded article of synthetic resin obtained by cellular molding process of the said expanded beads.

In the conventional example of above-mentioned (c), the disadvantage is that, since the said thermoplastic resin extruded foam sheet 54 has to be separately produced by foamed extrusion process, and stuck to the said thermoplastic resin sheet 53 beforehand, the production process is complicated and the production efficiency is poor.

Also, in the conventional example of above-mentioned (d), since the surface 2a of the said cellular molding articles of synthetic resin 2 is not smooth, as shown in FIG. 31, the prescribed range D of the surface 3a of the said thermoplastic skin material 3 is pressed from the backside 3b against the surface 15a of the said one mold part 15 harder than the other range E by pressurizing force G when melt bonding and uniting this cellular molded article of synthetic resin 2 with thermoplastic resin skin material 3 are operated.

Therefore, as is the case of simultaneous united molding of above-mentioned (b), the said range D appears as circular so-called beads pattern when looked over, and it is disadvantageous as it deteriorates the appearance of the obtained cellular molded article of synthetic resin having surface skin 51. Also, when cellular molded article of synthetic resin 2 and thermoplastic resin skin material 3 are united by both heat and adhesive, similar beads pattern is observed. Moreover, when they are united by adhesive without heat, the similar beads pattern is observed, and it is disadvantageous as above-mentioned.

This invention has been accomplished in consideration of above-mentioned disadvantages, and aims to provide a method for producing cellular molded article of synthetic resin having surface skin which comprises of cellular molded article of synthetic resin obtained by cellular molding of expanded beads in which poor melt bonding does not occur and thermoplastic resin skin material united with this cellular molded article which has excellent appearance without beads pattern on its surface, and which has good production efficiency, and a mold used for producing thereof.

DISCLOSURE OF THE INVENTION

An essential feature residing in a method for producing cellular molded article of synthetic resin having surface skin of this invention is that in a method for producing cellular molded article of synthetic resin having surface skin in which thermoplastic resin skin material formed in this molding chamber is set on one of two mold parts which comprises the molding chamber and after clamping the parts, expanded beads are charged in this molding chamber, then expanded and melt bonded together by steam heating along with being melt bonded and united with the said thermoplastic resin skin material, at least the part for setting the said thermoplastic resin skin material of the said one mold part is made of gas permeable metal mold or gas permeable ceramic mold or gas permeable electron casted mold having fine gas permeable hole of not more than 100 $\mu$m in diameter on the whole surface and also the said one part is made to be the upper mold part and the other part is made to be the lower mold part at least during the said steam heating and before the expanding of the said expanded beads. Accordingly, by vacuum pumping of the inside of the molding chamber through vapor holes or the like set in said the other part, remaining drain in the said molding chamber can be easily removed through the lower vapor holes or the like by utilizing gravity rather than going against it. Therefore, this drain can be surely removed, and advantage is that drain remains non or little in the said molding chamber. Since a thermoplastic resin skin material is molded in the said molding chamber and set on the said one mold, advantage is also that a process molding the said thermoplastic resin skin material in advance in other molding chamber or the like can be skipped. Moreover, since at least the part for setting the said plastic resin skin material of the said one mold part is made of gas permeable metal mold, gas permeable ceramic mold or gas permeable electron casted mold having fine gas permeable holes of not more than 100 $\mu$m in diameter on the whole surface, in the case of setting the said thermoplastic resin skin material on the said one mold by vaccum forming, permeability of air or gas between this gas permeable electron casted mold or the like and the said thermoplastic resin skin material can be improved more. Also it is advantageous that the said thermoplastic resin skin material is attached more firmly on the surface of one mold part and marks of the said gas permeable holes is not left on the surface of the said thermoplastic resin skin material because diameter of the said gas permeable holes is very fine which is not more than 100 $\mu$m.

An essential feature residing in a method for producing a cellular molded article of synthetic resin having a surface skin in which thermoplastic resin skin material is set on one of two mold parts which comprises molding chamber and after clamping mold parts, the expanded beads are charged in this molding chamber and expanded and melt bonded together by steam heating along with being melt bonded and united with the said thermoplastic resin skin material, fine unevenness of 5 to 150 $\mu$m in amplitude and 30 to 600 $\mu$m in wavelength of surface roughness waveshape measured by the surface roughness measuring instrument is formed in advance, when melting the said expanded beads together along with melting and uniting these expanded beads with the said thermoplastic resin skin material, by printing the said fine unevenness to the surface of the said thermoplastic resin skin material to make the surface roughness of thermoplastic resin skin material of a prescribed range which is pressed harder on the surface of one mold part by expanding force of the said expanded beads and the surface roughness of the other range to become about the same, the surface roughness of this thermoplastic resin skin material is kept nearly uniform. Accordingly, in so-called simultaneous united molding, by printing the fine roughness of the said one mold part with expanding force of the expanded beads, roughness of the fine unevenness formed on the surface of the said thermoplastic resin skin materials respectively can be surely made to be approximately the same. Therefore, the appearance of the article can be improved more efficiently, and advantage of this invention is that a cellular molded article of synthetic resin having surface skin and excellent appearance without residing previous beads pattern can be produced.

An essential feature residing in a method for producing a cellular molded article of synthetic resin having a surface skin in which thermoplastic resin is set on one of two mold parts which comprises the molding chamber and after clamping mold parts, expanded beads are charged in this molding chamber and expanded and melt bonded together by steam heating along with being melted and united with the said thermoplastic resin skin material, the unevenness printing item materials are attached to the surface of the said one part in advance, and when melt bonding the said expanded beads together along with melt bonding and uniting these expanded beads with the said thermoplastic resin skin material, by printing the fine unevenness formed on the surface of the said unevenness printing item material having 5 to 150 $\mu$m in amplitude, 30 to 600 $\mu$m in wavelength of surface roughness waveshape measured by the surface roughness measuring instrument to make the surface roughness of thermoplastic resin skin material of a prescribed range which is pressed harder on the surface of the unevenness printing item material by expanding force of the expanded beads and the surface roughness of the other range to be about the same degree to the surface of the said thermoplastic resin skin material, the surface roughness of this thermoplastic resin skin material is approximately kept constant. Therefore, in so-called simultaneous united molding, even when the unevenness printing item material is attached, by printing the fine unevenness of this unevenness printing item material with expanding force of expanded beads, the fine unevenness to be formed on the surface of the said thermoplastic resin skin material respectively can be surely kept approximately constant. Accordingly, the cellular molded article of synthetic resin having surface skin having more excellent appearance without beads pattern as is similar to an effect mentioned in the claim 4 can be produced, and the present facility can be used as it is. Also, advantage is that, when this unevenness printing item material is to be removable from the said one mold part, this can be utilized in various kinds of facilities.

An essential feature residing in a method for producing a cellular molded article of synthetic resin having a surface skin in which cellular molded article of synthetic resin and thermoplastic resin skin material are set between two mold parts, and when clamping parts and pressurizing them, these cellular molded article of synthetic resin and thermoplastic resin skin material are united by heat and/or adhesive, the fine unevenness of 5 to 150 $\mu$m in amplitude and 30 to 600 $\mu$m in wavelength of surface roughness waveshape measured by the surface roughness measuring instrument is formed in advance, and when uniting the said cellular molded article of synthetic resin with the thermoplastic resin skin material, by printing the said fine unevenness to the surface of the thermoplastic resin skin material to make the surface roughness of a prescribed range of thermoplastic resin skin material which is pressed harder on the surface of the said one mold part with pressurizing force and the surface roughness of the other range to be about the same, the surface roughness of this thermoplastic resin skin material is approximately kept in constant. Therefore, in so-called afterward attached molding, by printing the fine unevenness of the said one mold part with pressurizing force, the surface roughness of fine unevenness formed respectively on the surface of the said thermoplastic resin skin material can be surely kept approximately constant. Accordingly, advantage of this invention is that the cellular molded article of synthetic resin having surface skin and more excellent appearance without residing beads pattern can be produced.

An essential feature residing in a method for producing a cellular molded article of synthetic resin having a surface skin in which cellular molded article and thermoplastic resin skin material are set between two mold parts, and when clamping them and pressurizing them, these cellular molded article of synthetic resin and the thermoplastic resin skin material are united by heat and/or adhesive, unevenness printing item material is attached in advance on the surface of one mold part which will come in contact with the said thermoplastic resin skin material, and when uniting the said cellular molded article of synthetic resin with the thermoplastic resin skin material, by printing the fine unevenness formed on the surface of the said unevenness printing item material having 5 to 150 $\mu$m in amplitude, 30 to 600 $\mu$m in wavelength of surface roughness waveshape measured by the surface roughness measuring instrument to make the surface roughness of the thermoplastic resin of a prescribed range which is pressed harder to the surface of the said unevenness printing item material by the above-mentioned pressurizing force and the surface roughness of the other range to be about the same degree on the surface of the thermoplastic resin skin material, the surface roughness of this thermoplastic resin skin material is approximately kept constant. Therefore, in so-called afterward attached molding, even in a case of attaching the unevenness printing item material, by printing the fine unevenness of this unevenness printing item material with pressurizing force, the roughness of fine unevenness formed on the surface of the said thermoplastic resin skin material can be surely kept approximately constant. Accordingly, the cellular molded article of synthetic resin having surface skin and more excellent appearance without residing beads pattern can be produced as is similar to an effect mentioned in another embodiment and the present facilities can be used as it is. Also, advantage is that, when this unevenness printing item material is removable from the said one mold part, this item material can be utilized in various kinds of facilities.

An essential feature is that the roughness of the said fine unevenness has the waveform whose amplitude is in the range of 5 to 150 $\mu$m, wavelength is in the range of 30 to 600 $\mu$m measured by surface roughness measuring instrument. Accordingly, in so-called simultaneous united molding or afterward attached molding, by printing the fine unevenness of the said one mold part, the roughness of the fine unevenness formed on the surface of the said thermoplastic resin skin material respectively can be kept nearly constant in certain. Therefore, the appearance of the product can be improved more efficiently.

An essential feature is that in addition to the said fine unevenness, unevenness for product design pattern is formed in advance on the surface of the said unevenness printing item material, and when printing the said fine unevenness on the surface of the said thermoplastic resin skin material, the said unevenness for product design pattern is also to be printed on. Therefore, in the so-called simultaneous united molding or afterward attached molding, cellular molded article of synthetic resin having surface skin together with unevenness for product design pattern, which has more excellent appearance without residing beads pattern can be produced. Accordingly, advantage is that high-grade feeling or the like can be added to the cellular molded article of synthetic resin having surface skin.

An essential feature is that in a method for producing a cellular molded article of synthetic resin having a surface skin in which thermoplastic resin skin material is set on one of two mold parts which comprises the molding chamber and after clamping them, expanded beads are charged in this molding chamber, expanded and melt bonded together by steam heating along with being melt bonded and united with the said thermoplastic resin skin material, the fine unevenness whose difference from the said thermoplastic resin skin material is not more than 50 $\mu$m of amplitude and not more than 200 $\mu$m of wavelength in surface roughness waveshape measured by the surface roughness measuring instrument is formed in advance, and when melt bonding the said expanded beads together along with melt bonding and uniting these expanded beads with the said thermoplastic resin skin material, by printing the said fine unevenness on the surface of the thermoplastic resin skin material to make the surface roughness of a prescribed range of thermoplastic resin skin material which is pressed harder to the surface of one mold part with expanding force of the said expanded beads and the surface roughness of other range to be about the same, the surface roughness of this thermoplastic resin skin material is approximately kept in a constant level. Therefore, in so-called simultaneous united molding, by printing the fine unevenness of the said one mold part with expanding force of the expanded beads, the roughness of fine unevenness formed on the surface of the said thermoplastic resin skin material respectively can be surely kept approximately in a constant level. Accordingly, a cellular molded article of synthetic resin having surface skin and more excellent appearance without residing beads patterns can be produced. Moreover, since the beads pattern does not appear when the original surface roughness of the said thermoplastic resin skin material is very rough or very fine, advantage is that various kinds of thermoplastic resin skin materials can be used An essential feature is that in a method for producing a cellular molded article of synthetic resin a having surface skin in which cellular molded article of synthetic resin and thermoplastic resin skin material are set in between two mold parts, and when clamping the parts and pressurizing them, these cellular molded article of synthetic resin and thermoplastic resin skin material are united by heat and/or adhesive, the fine unevenness whose difference from the said thermoplastic resin skin material is not more than 50 μm of amplitude and not more than 200 μm of wavelength in surface roughness waveshape measured by the surface roughness measuring instrument is formed in advance, and when uniting the said cellular molded article of synthetic resin with the thermoplastic resin skin material, by printing the said fine unevenness to the surface of the thermoplastic resin skin material to make the surface roughness of a prescribed range of thermoplastic resin skin material which is pressed harder to the surface of the said other one mold part by pressurizing force and the surface roughness of other range to be approximately the same, the surface roughness of this thermoplastic resin is approximately kept in a constant level. Therefore, in so-called afterward attached molding, by printing the fine unevenness of the said one mold part with pressurizing force, the roughness of fine unevenness formed on the surface of the said thermoplastic resin skin material respectively can be surely kept approximately in a constant level. Accordingly, a cellular molded article of synthetic resin having surface skin and having more excellent appearance without residing beads pattern can be produced. Also, since this beads pattern does not appear even when the original surface roughness of the said thermoplastic resin skin material is very rough or very fine as is an effect mentioned in claim 10, various kinds of thermoplastic resin skin material can be used.

An essential feature is that difference between the waveshape of the roughness of the said fine unevenness and that of the surface roughness of the said thermoplastic resin skin material is not more than 50 μm of amplitude, not more than 200 μm of wavelength measured by surface roughness measuring instrument. Therefore, in so-called simultaneous united molding or afterward attached molding, various roughness of the fine unevenness formed on the surface of the said thermoplastic resin skin material can be by means of printing the fine unevenness of the said one mold part approximately kept in constant for certain. Therefore, the appearance of the product can be improved more efficiently.

An essential feature is that the unevenness for product design pattern in addition to the said fine unevenness is formed in advance on the surface of the said one mold part, and the said unevenness for product design pattern as well as the said fine unevenness is printed on the surface of the said thermoplastic resin skin material. Therefore, in so-called simultaneous united molding or afterward attached molding, a cellular molded article of synthetic resin having surface skin and unevenness for product design pattern, having more excellent appearance without residing beads pattern can be produced. Accordingly, advantage is that high-grade feeling or the like can be added to the cellular molded article of synthetic resin having surface skin.

An essential feature is that the unevenness for product design pattern is formed in advance on the surface of the said thermoplastic resin skin material before setting this thermoplastic resin skin material. Accordingly, in so-called simultaneous united molding or afterward attached molding, the advantages are that the obtained cellular molded article of synthetic resin having surface skin has more excellent appearance without residing beads pattern as the same effects mentioned in claim 9 and 13 and high-grade feeling or the like can be obtained by the said unevenness for product design pattern. And since it is not necessary to form unevenness for product design pattern on the surface of the said one mold part, the production cost can be reduced.

Furthermore, an essential feature residing in a mold used for producing cellular molded article of synthetic resin having surface skin of this invention is that in a mold used for producing a cellular molded article of synthetic resin having a surface skin by a method in which thermoplastic resin skin material is set on one of two mold parts which comprises a molding chamber and after clamping them, expanded beads are charged in this molding chamber, then expanded and melt bonded together by steam heating along with being melt bonded and united with the said thermoplastic resin skin material, fine unevenness having 5 to 150 μm of amplitude, 30 to 600 μm of wavelength in surface roughness waveshape measured by the surface roughness measuring instrument is formed on the surface of the said one mold part. Therefore, when using this mold part in so-called simultaneous united molding, as is similar to an effect mentioned in claim 4, advantage is that a cellular molded article of synthetic resin having surface skin and having more excellent appearance without residing beads pattern can be produced.

An essential feature is that in a mold used for producing a cellular molded article of synthetic resin having a surface skin by a method in which cellular molded article of synthetic resin and thermoplastic resin skin material are set in between two mold parts, and when clamping the parts and pressurizing them, these cellular molded article of synthetic resin and thermoplastic resin skin material are united by heat and/or adhesive, the fine unevenness having not more than 5 to 150 μm of amplitude, not more than 30 to 600 μm of wavelength in surface roughness waveshape measured by the surface roughness measuring instrument is formed on the surface of the one mold part which will come in contact with the said thermoplastic resin skin material. Therefore, when using this mold in so-called afterward attached molding, an advantage is that a cellular molded article of synthetic resin having surface skin and more excellent appearance without remaining beads pattern can be produced.

An essential feature is that the roughness of the said fine unevenness has waveshape whose amplitude is in the range of 5 to 150 μm, wavelength is in the range of 30 to 600 μm measured by surface roughness measuring instrument. Therefore, when using this mold in so-called same time uniting molding or afterward attached molding, by printing the fine roughness of the said one mold part, the roughness of fine unevenness formed on the surface of the said thermoplastic resin skin material respectively can be approximately kept in constant level for certain. Accordingly, advantage is that the appearance of the product can be improved more efficiently.

An essential feature is that in a mold used for producing cellular molded article of synthetic resin having surface skin by a method in which thermoplastic resin skin material is set on one of two mold parts which comprises molding chamber, and after clamping them, expanded beads are charged in this molding chamber and then expanded and melt bonded together by steam heating along with being melt bonded and united with the said thermoplastic resin skin material, fine unevenness whose difference is not more than 50 μm of amplitude, not more than 200 μm of wavelength in surface roughgness waveshape measured by the surface roughness measuring instrument is formed on the surface of the said one mold part. Therefore, when using this mold in so-called simultaneous united molding, an advantage is that a cellular molded article of synthetic resin having surface skin and more excellent appearance without residing beads pattern can be produced. Also, since this beads pattern does not appear even when the original surface roughness of the said thermoplastic resin skin material is very rough or very fine, various kinds of thermoplastic resin skin material can be used.

An essential feature is that in a mold used for producing cellular molded article of synthetic resin having surface skin by the method in which cellular molded article of synthetic resin and thermoplastic resin skin material are set in between two mold parts, and when clamping the parts and pressurizing them, these cellular molded article of synthetic resin and thermoplastic resin skin material are united by heat and/or adhesive, fine unevenness whose difference is not more than 50 μm of amplitude, not more than 200 μm of wavelength in surface roughness waveshape measured by the surface roughness measuring instrument is formed on the surface of the one mold part which will come in contact with the said thermoplastic resin skin material. Therefore, when using this mold in so-called afterward attached molding, a cellular molded article of synthetic resin having surface skin and more excellent appearance without residing beads pattern can be produced. Moreover, since this beads pattern does not appear when the original surface roughness of the said thermoplastic resin skin material is very rough or very fine, advantage is that various kinds of thermoplastic resin skin materials can be used.

An essential feature is that difference between the waveshape of roughness of the said fine unevenness and the waveshape of the surface roughness of the said thermoplastic resin skin material is not more than 50 μm of amplitude, not more than 200 μm of wavelength measured by surface roughness measuring instrument. Therefore, using this mold in so-called simultaneous united molding or afterward attached molding, the roughness of the fine unevenness formed on the surface of the said thermoplastic resin skin material respectively can be approximately kept in constant level for certain by printing fine unevenness of the said one mold part. Accordingly, advantage is that the appearance of the product can be improved more efficiently.

An essential feature is that unevenness for product design pattern in addition to the said fine unevenness is formed. Therefore, when using this mold in so-called simultaneous united molding or afterward attached molding, an advantage is that the obtained cellular molded article of synthetic resin having surface skin has more excellent appearance without residing beads pattern, and high-grade feeling or the like can be attached additionally to the cellular molded article of synthetic resin having surface skin by the said unevenness for product design pattern.

BEST MODE FOR PRACTICING THE INVENTION

Embodiments of this invention are described below, based on the drawings, and when the same composition as the mentioned prior art comes out, its explanation is abbreviated by using the prescribed mark. In embodiments 1 to 6, the cases of applying so-called simultaneous united molding are explained, and in embodiments 7 to 8, the cases of applying so-called afterward attached molding are explained.

Figure 1:
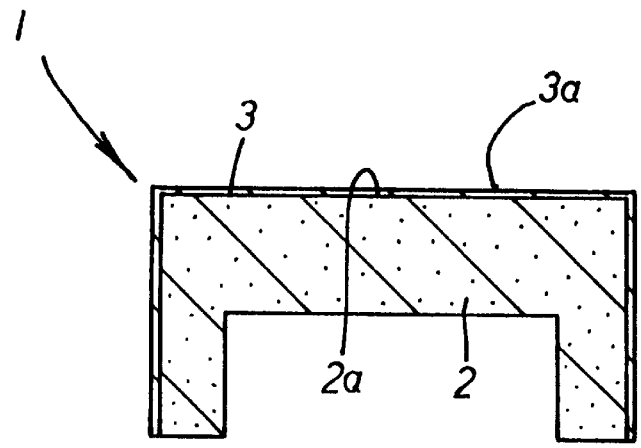
FIG. 1 is a side cross-sectional drawing of cellular molded article of synthetic resin having surface skin of embodiments.

As shown in FIG. 1, a producing method of embodiment 1 is for producing cellular molded article of synthetic resin having surface skin 1 which comprises of cellular molded article of synthetic resin 2 and thermoplastic resin skin material 3 melt bonded and united with the surface 2a of the cellular molded article of synthetic resin 2.

This production method, as shown in FIGS. 2 to 7, is that in a method for producing a cellular molded article of synthetic resin having surface skin 1 in which thermoplastic resin skin material 3 formed in this molding chamber 7 is set on one mold part 5 of two mold parts 5 and 6 which comprises molding chamber 4 and after clamping the mold parts, expanded beads 8 are charged in this molding chamber 7, and expanded, melt bonded together by steam heating along with being melt bonded and united with the said thermoplastic resin skin material 3, the part of the said one mold part 5 on which thermoplastic resin skin material 3 is set is, for example, made of gas permeable electron casted mold 5d having fine gas permeable holes from some tens μm to a hundred μm on the whole surface 5a and the said one mold part 5 is made to be the upper part, and the other part 6 is made to be the lower part during the said steam heating and before expanding the said expanded beads 8.

Figure 2:
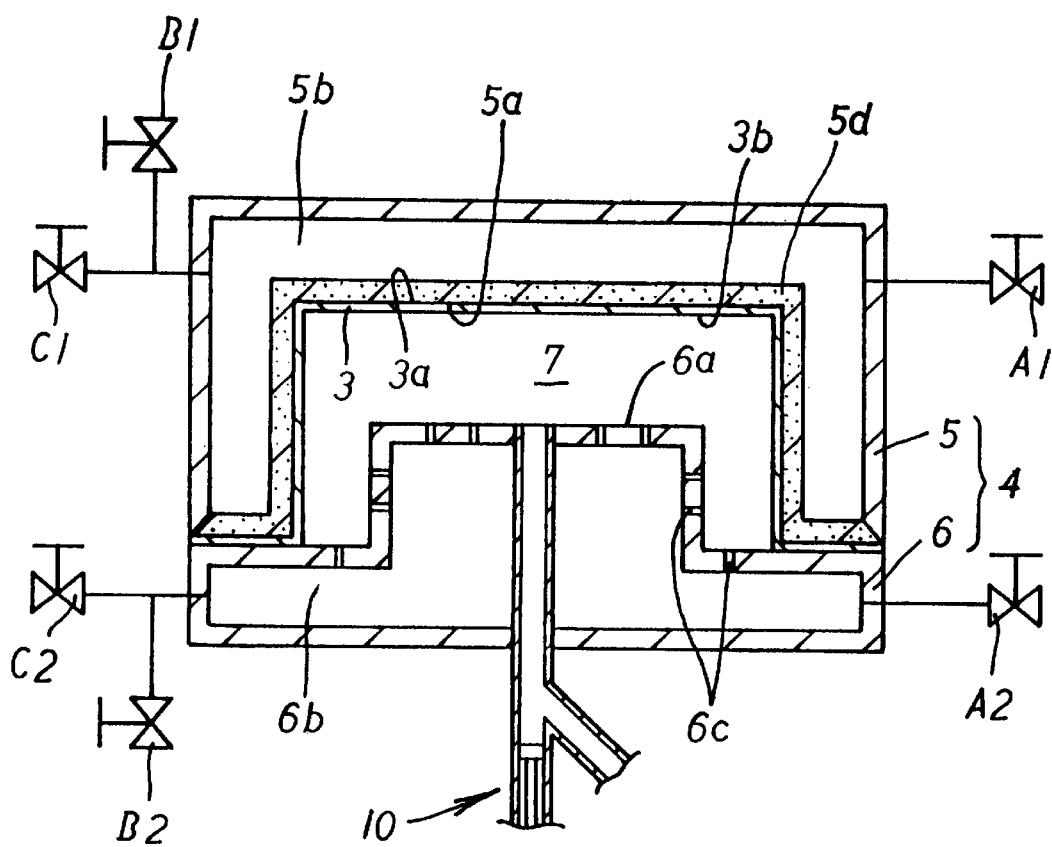
FIG. 2 is a side cross-sectional explanatory drawing showing clamped state of mold parts with forming and setting thermoplastic resin skin material on one of the parts in a method for producing cellular molded article of synthetic resin having surface skin of the embodiment 1.

First, as shown in FIG. 2, the thermoplastic resin skin material 3 formed in this molding chamber 7 is set on the said one mold part 5, and mold parts are clamped.

Here, the said molding chamber 4 comprises of two mold parts 5,6 which can be opened and clamped with a vertical motion, and the said one part 5 is made to be the upper part, the other part 6 is made to be the lower part.

The said one mold part 5, for example, has concave shape in side cross section forms chamber 5b inside. And steam valve A1, decompression valve B1 and drain valve C1 are connected to the said chamber 5b respectively.

The said the other mold part 6, for example, has convex shape in side cross section, forms chamber 6b inside and has a plurality of vapor holes 6c on the surface 6a side connecting to the said chamber 6b. And steam valve A2, decompression valve B2 and drain valve C2 are connected to the said chamber 6b respectively, feeder 10 is set up to charge expanded beads 8 into the said molding chamber 7.

As examples of the said thermoplastic resin skin material 3, thermoplastic resin sheet including a vinyl chloride resin or polyolefine resin such as polyethylene resin, polypropylene resin can be mentioned among others. And since this thermoplastic resin skin material 3 is used as a surface skin of the cellular molded article of synthetic resin having surface skin 1, this thermoplastic resin skin material 3 may be colored with a desired color by coloring toner and the like according to the application.

Since this thermoplastic resin skin material 3 is set on the surface 5a of the said one mold part 5 after formed in the said molding chamber 7, it is advantageous that a process to form this thermoplastic resin skin material 3 in advance in other molding chamber or the like can be skipped. As for forming methods for this, for example, vacuum forming or slash forming can be mentioned among others.

The part of the said one mold part 5 on which thermoplastic resin skin material 3 is set is, for example, made of gas permeable electron casted mold 5d.

This gas permeable electric casted mold 5d has gas permeability because of having numerous very fine gas permeable holes from some tens μm to a hundred μm of diameter connecting to the said chamber 5b on the whole surface 5a, and it is, for example, produced by nickel electric cast and the like. (e.g. PORASUDENTYU; trade name, made by KONAN TOKUSYU SANGYO Co.)

Thus, since the said gas permeable electric cast 5d has such very fine gas permeable holes from some tens to a hundred μm of diameter on the whole surface 5a, as is above-mentioned, when setting the said thermoplastic resin skin material 3 on the said one mold part 5 by vacuum forming, the removability of the air or gas between this gas permeable electric cast mold 5d and the said thermoplastic resin skin material 3 can be improved. Therefore, the said thermoplastic resin skin material 3 can be stuck to the surface 5a of the one mold part 5 more firmly. And since the diameter of the said gas permeable holes is very fine which is in the range from about some tens μm to 100 μm, advantage is also that the marks of these gas permeable holes are not printed on the surface 3a of the thermoplastic resin skin material 3.

And in place of the said gas permeable electric cast mold 5d, a gas permeable metal mold or a gas permeable ceramic mold (e.g. POSERAKKUSU II; trade name, made by SHINTOU KOGYO) having very fine gas permeable holes of about some μm of diameter on the whole surface 5a made by sintering metal or ceramic particles under a prescribed condition can be also used.

When it is necessary for the obtained cellular molded article of synthetic resin having surface skin 1 to have a mounting or the like, for example, for connecting with another member, an insert material of a prescribed shape (Not shown in Figures) may be set in advance on the surface 6a of the said the other mold part 6 and the said insert material may be united with cellular molded article of synthetic resin 2 produced by expanding and melt bonding the said expanded beads 8 together when cellular molding of these expanded beads 8 is conducted.

Figure 3:
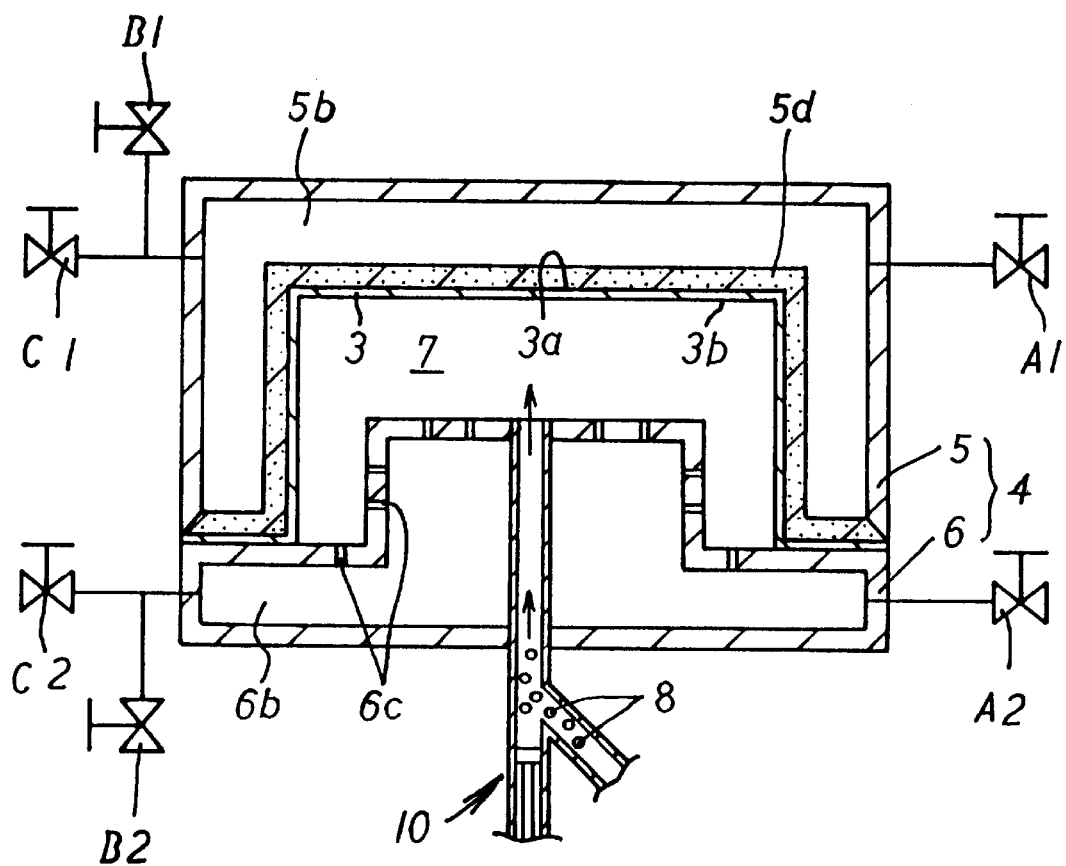
FIG. 3 is a side cross-sectional explanatory drawing showing the way of charging expanded beads in the molding chamber.

Next, as shown in FIG. 3, expanded beads 8 are charged into the molding chamber 7 from the said feeder 10. In this case, in order to charge expanded beads 8 more easily, the charging can be performed with keeping the mold parts a little open (cracking), however, the width of the opening is not so wide to keep these expanded beads not to drop out.

As example of the synthetic resin comprising the said beads 8, polyolefine resin, polystyrene resin can be mentioned among others.

As example of the said polyolefine resin, polyethylene resin or polypropylene resin such as low density polyethylene, middle density polyethylene, high density polyethylene, linear low density polyethylene, ethylene-vinyl acetate copolymer, propylene homopolymer, ethylene-propylene random copolymer, ethylene-propylene block copolymer, ethylene-propylene-butene random terpolymer, propylene-vinyl chloride copolymer, propylene-butene copolymer, propylene-maleic anhydride copolymer, poly (butene-1) can be mentioned among others, and these can be used alone or as a mixture of not less than two.

This polyolefine resin is preferably not cross-linked, however, may be cross-linked by using peroxide, radiation or the like.

Furthermore, a mixture of this polyolefine resin and other thermoplastic resin can be used. As examples of these thermoplastic resins, when mixing with the said polypropylene resin, low density polyethylene, linear low density polyethylene, vinyl aromatic polymer, polybutene, ionomer can be mentioned among others, and when mixing with the said polyethylene resin, for example, vinyl aromatic polymer, polybutene, ionomer can be mentioned among others. And the amount of the thermoplastic resin to be mixed in these cases is preferably not more than 20 parts by weight based on the 100 parts by weight of the polyolefine resin, more preferably 5 to 10 parts by weight.

The said expanded beads 8 may be produced, for example, to be the pre-expansion by a method in which the said synthetic resin is processed to form particle shape in advance, impregnated with a volatile blowing agent in a pressure vessel, stirred while being dispersed in water, heated up under pressure to a prescribed expansion temperature, and then this water dispersion is released into a low pressure region or the like. Among these expanded beads 8, for example, EPERAN PP (trade name; made by KANEGAFUCHI CHEMICAL INDUSTRY Co., Ltd., expansion ratio is 15 times) can be suitably used among others.

In order to improve the adhesiveness of the said cellular molded article of synthetic resin 2 obtained by cellular molding of these beads 8 and thermoplastic resin skin material 3, suitable adhesive can be applied beforehand to the backside surface 3b of this thermoplastic resin skin material 3 which will come in contact with the said expanded beads 8 if necessary. As example of this adhesive, an organic solvent solution of synthetic resin, a resin emulsion, a resin powder or the like can be mentioned.

Figure 4:
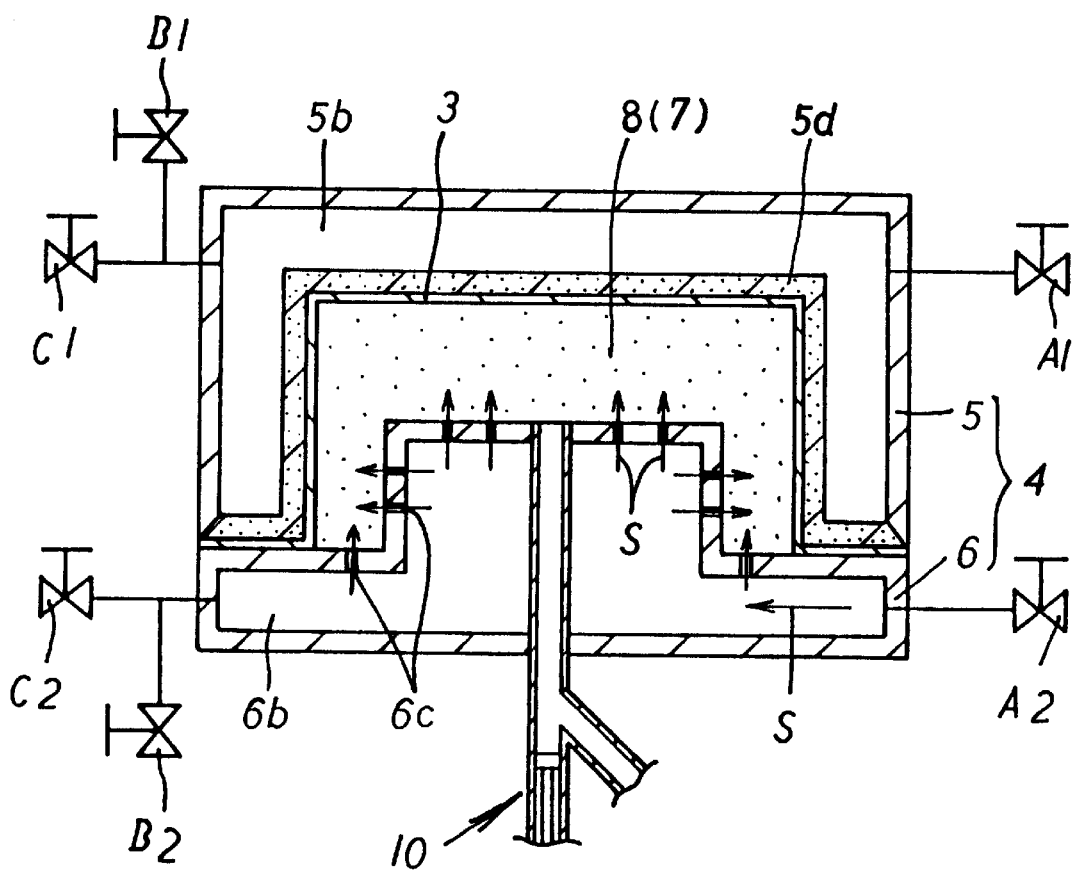
FIG. 4 is a side cross-sectional explanatory drawing showing the way of supplying steam into the molding chamber after charging expanded beads.

Then, as shown in FIG. 4, the steam valve A2 connected to the chamber 6b of the said the other mold part 6 is opened, and steam S is supplied into the molding chamber 7 through the said steam hole 6c, and the said expanded beads 8 are heated and expanded.

At this point, by pre-heating the said expanded beads 8 in advance at a temperature lower than the temperature of melt bonding the said expanded beads 8 together, before main heating of these expanded beads 8 at a temperature higher than the temperature of melt bonding the said expanded beads 8 together, these expanded beads 8 can be heated sufficiently without melt bonding together.

Figure 5:
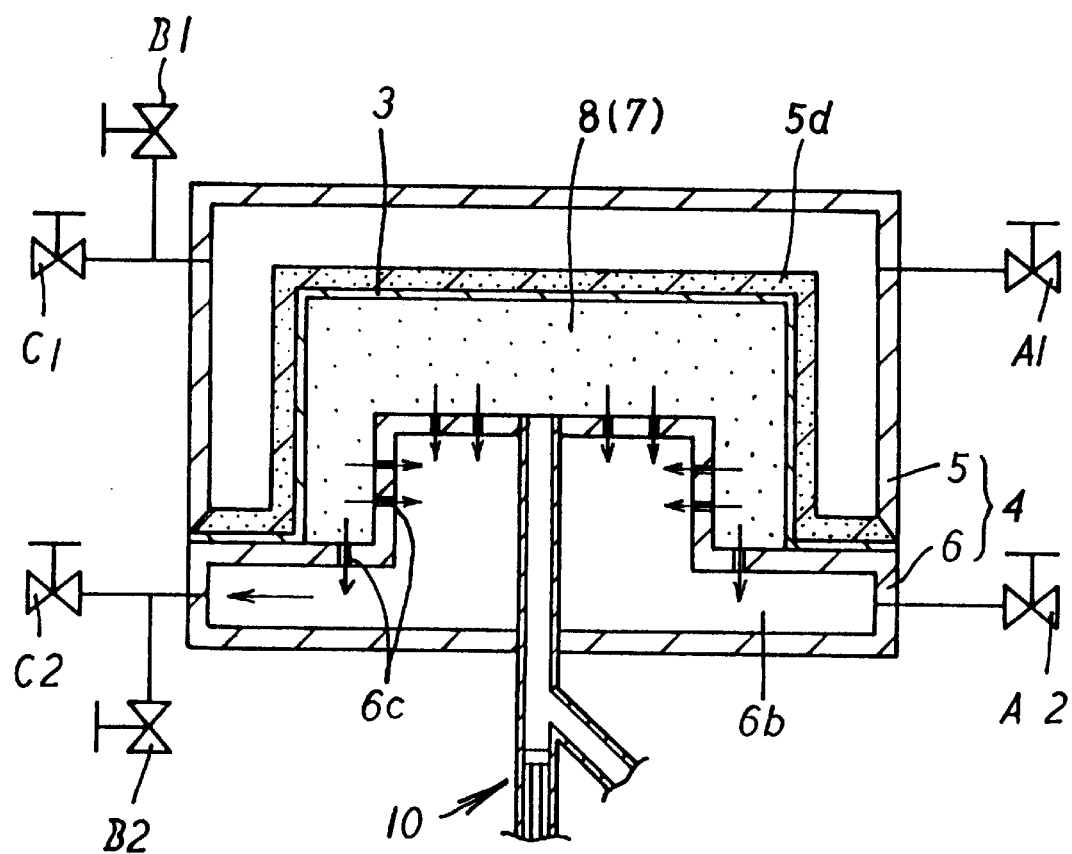
FIG. 5 is a side cross-sectional explanatory drawing showing the way of vacuum pumping from the molding chamber.

And after the pre-heating, by keeping the condition for a prescribed time and steaming the said expanded beads 8 by steam S (this is called "steaming", hereinafter), the latent heat of steam S introduced among the said beads 8 can be utilized effectively. In particular in the case of fabricating cellular molded article of synthetic resin having surface skin 2 which is very thick or the like, an advantage is that the said expanded beads 8 can be heated more uniformly. This "steaming" may be carried out in the condition of continuous introduction of steam S. Alternatively, the "steaming" may be carried out with suspending the supply of steam S and with keeping the drain valve C2 open if necessary. And after performing "steaming" by steam S, drain (moisture) exists among the pre-expanded beads 8, and since poor melt bonding of the expanded beads 8 with each other can occur if main heating is carried out in this condition, as shown in FIG. 5, for example, it is preferable that the said drain in the molding chamber 7 is removed by vacuum pumping through the said vapor hole 6c or the like.

And after performing "steaming" of the said expanded beads 8 by steam S, that is, during the said steam heating and before expanding the said expanded beads 8, since the said one mold part 5 is the upper part and the said the other part 6 is the lower part, the said drain can be easily taken out through the lower vapor hole 6c by the above-mentioned vacuum pumping by utilizing the gravity power rather than going against it Therefore, this drain can be surely removed and advantage is that non or little drain remains in the said molding chamber 7.

Figure 6:
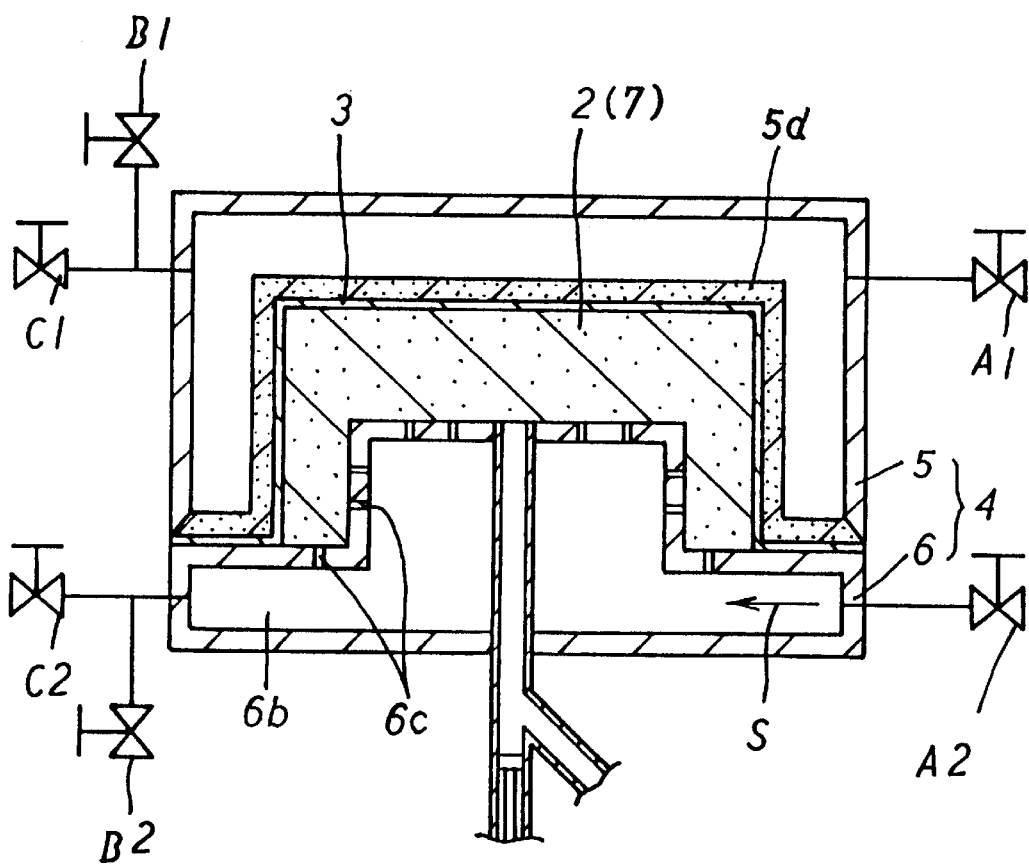
FIG. 6 is a side cross-sectional explanatory drawing showing cellular molded state of expanded beads after supplying steam in the molded chamber.

Next, the main heating is carried out at a temperature higher than the temperature at which said expanded beads 8 melt bonded together. This main heating is, as shown in FIG. 6, carried out by opening the said steam valve A2 and supplying steam S through the said vapor hole 6c into the molding chamber 7. And in the case of conducting vacuum pumping in the said molding chamber 7 to remove drain after performing "steaming" by steam S as mentioned-above, the steam S for the said main heating can be supplied into the molding chamber 7 more easily. When main heating, in order to transfer enough heat by steam S to the said expanded beads 8, it is preferable to keep the condition for a prescribed time.

Figure 7:
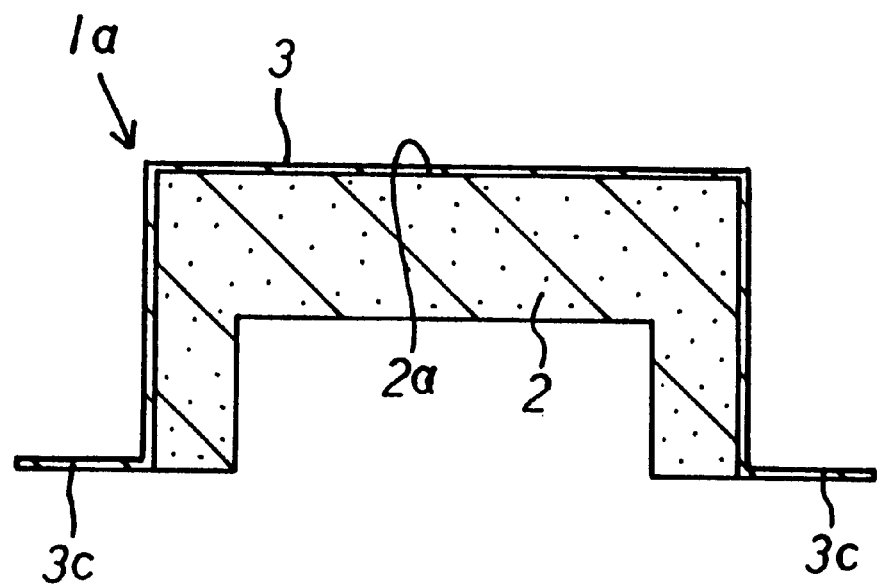
FIG. 7 is a side cross-sectional drawing of cellular molded article of synthetic resin having surface skin having edge part of the skin material separated from the molding chamber.

Next, by opening the mold after cooling the said molding chamber 4 or the like, as shown in FIG. 7, cellular molded article of synthetic resin having surface skin 1a having the edge part 3c, for example, which comprises of the cellular molded article of synthetic resin 2 obtained by the cellular molding of the said expanded beads 8 and thermoplastic resin skin material 3 melt bonded and united with the surface 2a of the cellular molded article of synthetic resin 2 is obtained. And this cellular molded article of synthetic resin having surface skin 1a is preferable to be aged and dried after separated from the molding chamber 4. And as is in this embodiment, when unnecessary part such as the said edge part 3c is formed at the end of the said thermoplastic resin skin material 3 or the like, by cutting this edge part, cellular molded article of synthetic resin having surface skin 1 shown in FIG. 1 can be obtained.

As above-mentioned, by main heating the said expanded beads 8 after pre-heating and performing "steaming" by steam S, cellular molded article of synthetic resin 2 can be melt bonded and united with the said thermoplastic resin skin material 3 along with producing the cellular molded article of synthetic resin 2 from expanded beads 8. And since the said drain can be surely removed, celular molded article of synthetic resin having surface skin 1 with having the said cellular molded article of synthetic resin 2 without poor melt bonding of expanded beads 8 can be produced.

In this embodiment 1, when setting the said thermoplastic resin skin material 3 on the said one mold part 5, the said two mold 5,6 is opened and clamped with a vertical motion and the said one mold part 5 is the upper part, the other part 6 is the lower part, however, these embodiments are not limited to this, but the above-mentioned condition is kept at least during the said steam heating and before expanding the said expanded beads 8.

That means, for example, molding machine or the like that can change the direction of opening or clamping of the said two die 5,6 can be used. In this case, for example, in order to set the said thermoplastic resin skin material 3 more easily, the said two mold parts can be opened and clamped with a horizontal motion at the start, or with a vertical motion with the said one mold part 5 to be the lower part at the start and during the said steam heating and before expanding the said expanded beads 8, the said two mold parts are turned to be opened and clamped with a vertical motion and the said one mold part 5 is turned to be the upper part, the other part 6 to be the lower part, as its result, the said drain can be removed easily. After removing the drain, the mold parts can be turned back to the original position again to separate the obtained cellular molded resin of synthetic resin having surface skin 1 from the mold easily.

Moreover, before setting thermoplastic resin skin material 3 on the said one mold part 5, the unevenness for product design pattern such as skin emboss can be formed in advance on the surface 3a of the thermoplastic resin skin material 3 or when cellular molding of the expanded beads 8 by the said steam heating, the unevenness for product design pattern such as skin emboss formed in advance on the surface 5a of the said one mold part 5 can be printed on the surface 3a of the thermoplastic resin skin material 3.

As shown in FIG. 9 to FIG. 12, a method for producing cellular molded article of synthetic resin 1 having surface skin of the embodiment 2 comprises that the part on which the said thermoplastic resin skin material 3 does not consist of the said gas permeable electron casted mold 5d and that the said fine unevenness 9 having 5 to 150 $\mu$m of amplitude, 30 to 600 $\mu$m of wavelength in surface roughness waveshape measured by the surface roughness measuring instrument is formed in advance on the surface 5a of the said one mold part 5 having plural number of decompression hole 5c connecting to the said chamber 5b and that when melt bonding the said expanded beads 8 along with melt bonding and uniting theses expanded beads 8 with the thermoplastic resin skin material 3, by printing the said fine unevenness 9 onto the surface 3a of the thermoplastic resin skin material 3 to make the surface roughness of a prescribed range D of thermoplastic resin skin material 3 pressed harder to the surface 5a of one mold part 5 with expanding force F of the said expanded beads 8 and the surface roughness of the other range E to be approximately the same the surface roughness of this thermoplastic resin skin material 3 is kept approximately constant.

Figure 9:
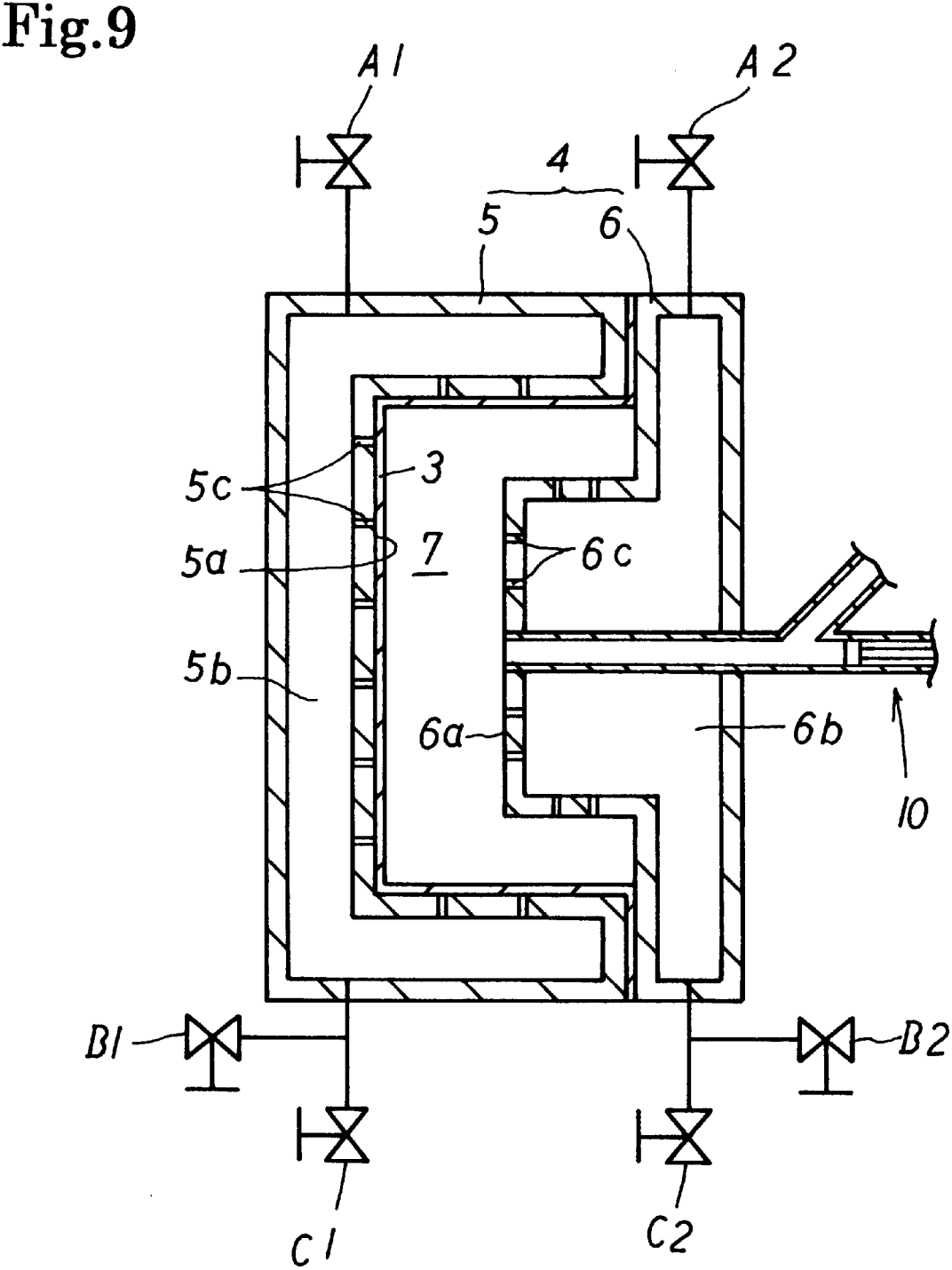
FIG. 9 is a side cross-sectional explanatory drawing of clamped state with setting thermoplastic resin skin material on the surface of one mold part in a method for producing cellular molded article of synthetic resin having surface skin of the embodiment 2.

And as shown in FIG. 9, the said molding chamber 4, for example, can be opened and clamped with a horizontal motion in this embodiment, however, as is the said embodiment 1, the said one mold part 5 may be the upper part and the other part 6 may be the lower part at least during the said steam heating and before expanding the said expanded beads 8. And the part for setting thermoplastic resin skin material 3 on of the said one mold part 5 can be made of the said gas permeable electric cast mold 5d, gas permeable metal mold or gas permeable ceramic mold or the like.

Figure 10:
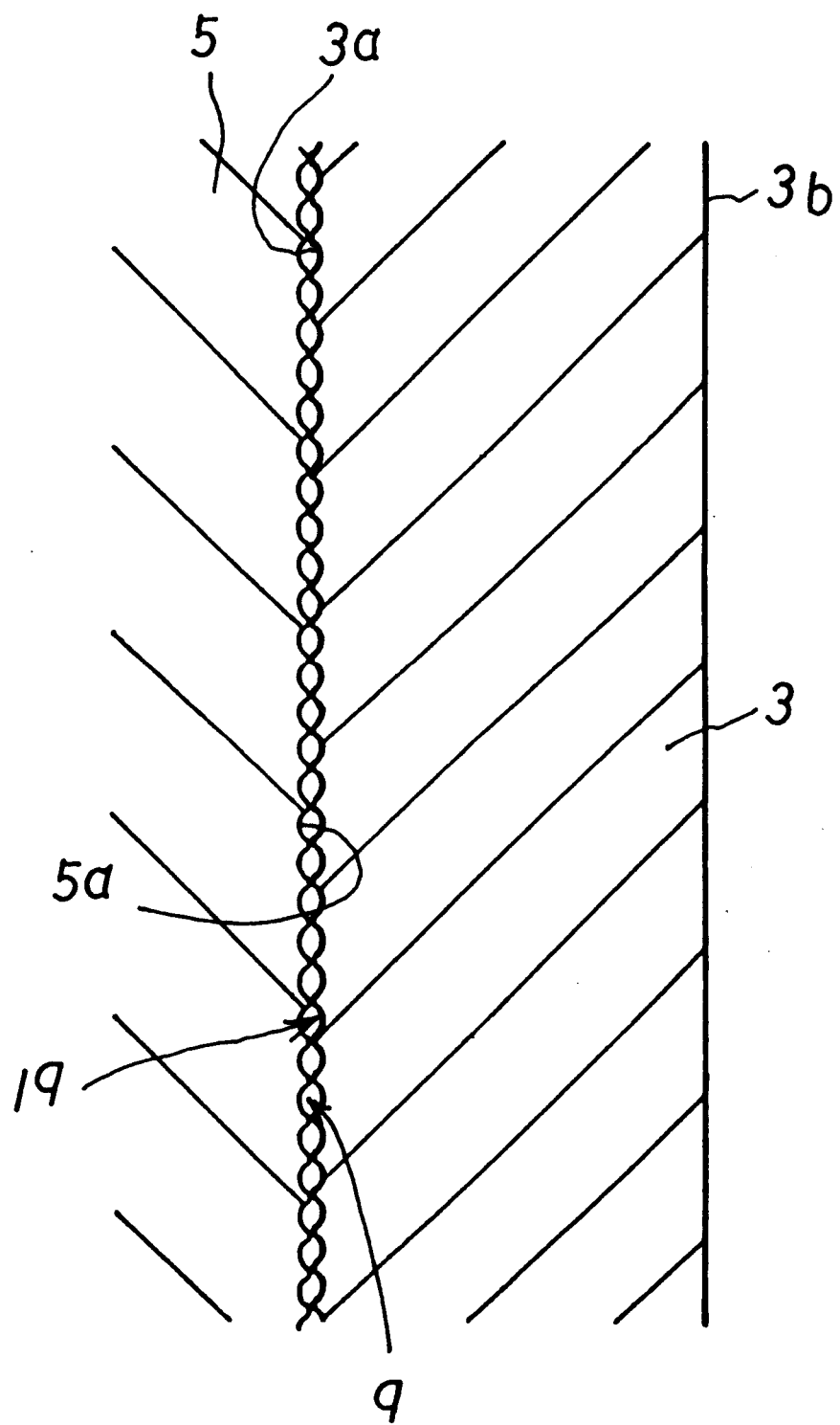
FIG. 10 is a side cross-sectional enlarged drawing of necessary part to show how the thermoplastic resin skin material of FIG. 9 is set.

As shown in FIG. 10, fine unevenness 19 is formed in advance on the surface 3a of the said thermoplastic resin skin material 3 by mat processing of a prescribed roughness the same as is the case of normal condition.

And the fine unevenness 9 having 5 to 150 $\mu$m of amplitude, 30 to 600 $\mu$m of wavelength in surface roughness waveshape measured by the surface roughness measuring instrument is formed in advance on the surface 5a of the said one mold part 5. In order to form this fine unevenness 9, for example, various conventional techniques such as blast, etching can be utilized.

Figure 11:
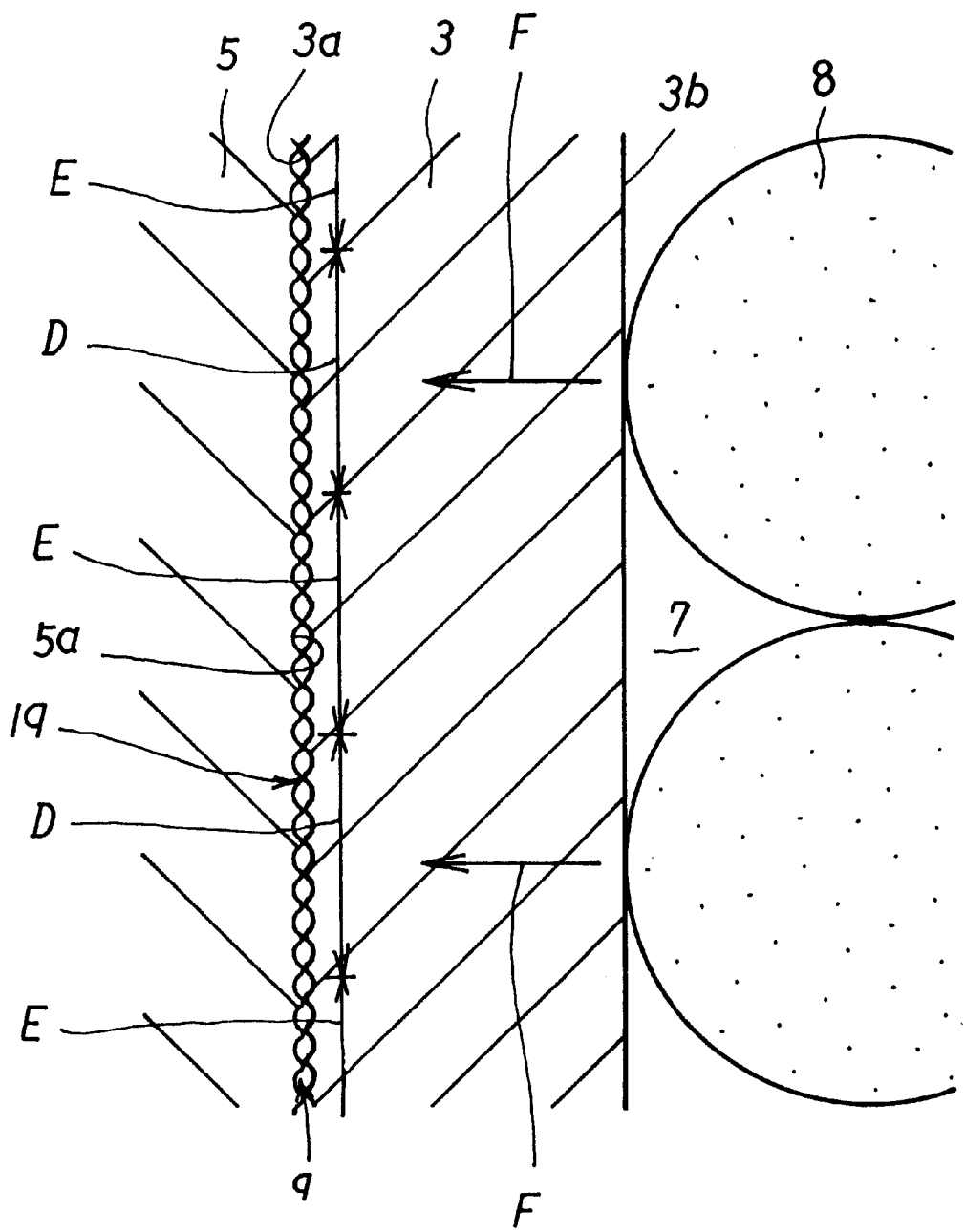
FIG. 11 is a side cross-sectional enlarged drawing of necessary part to show how expanded beads are cellular molded.
Figure 12:
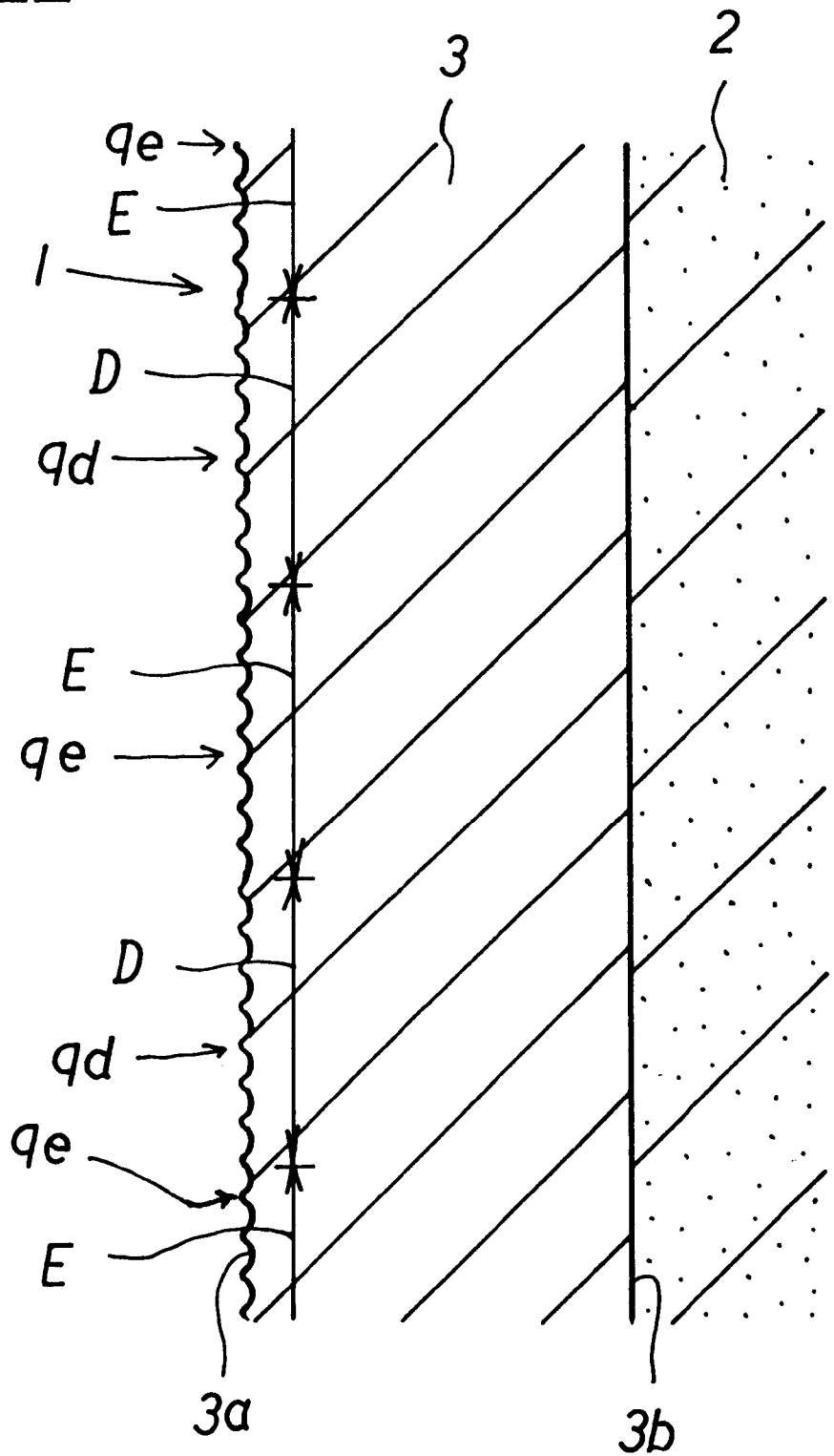
FIG. 12 is a side cross-sectional enlarged drawing of necessary part to show the vicinity of the surface of the obtained cellular molded article of synthetic resin having surface skin of this invention.

When performing the said main heating, as shown in FIG. 11, the prescribed range D of the surface 3a of the said thermoplastic resin skin material 3 is pressed against the surface 5a of the said one mold part 5 harder than the other range E from the backside 3b by the expanding force F of the said expanded beads 8. In this condition, since the said thermoplastic resin skin material 3 is softened by steam heating, as shown in FIG. 12, the said fine unevenness 9 formed in advance on the surface 5a of the said one mold part 5 is printed on, and the fine unevenness 9d is formed on the said range D where pressed harder as above-mentioned, Also, since the said the other range E is pressed against the surface 5a of the said one mold part 5 by force even smaller than that in range D, the said fine unevenness 9 is printed on the other range E and fine unevenness 9e is formed. In this case, since the strength of the force pressing against the surface 5a of the said one mold part 5 is different between in the said range D and in another range E, the roughness of the formed fine unevenness 9d, 9e respectively may be different, however, by forming fine unevenness 9 of roughness in the above-mentioned range in advance on the surface 5a of the said one mold part 5, the roughness of these fine unevenness 9d and 9e can be made to be about the same pattern level. Accordingly, the surface roughness of the said thermoplastic resin skin material 3 is approximately kept in a constant level, and it is advantageous that beads pattern as in conventional process does not appear and excellent appearance can be obtained more efficiently.

And it is preferable that the roughness of the said fine unevenness 9 has waveshape of surface roughness in which amplitude is from 5 to 150 $\mu$m, wavelength is from 30 to 600 $\mu$m, more preferably amplitude is from 7 to 100 $\mu$m, wavelength is from 50 to 400 $\mu$m, most preferably amplitude is from 10 to 70 $\mu$m, wavelength is from 60 to 300 $\mu$m.

The surface roughness of the said range, for example, corresponds to the roughness from #1000 (No.1000) to #100 (No.100) compared to the surface roughness of sandpaper or the like.

As the example of the said surface roughness measuring instruments, touching needle type surface roughness measuring instrument (e.g. made by TOKYO SEIMITSU Co, trade name: SAFUKOMU 570A, 5 $\mu$mR of the touching needle tip) or non-touching surface roughness measuring instrument (e.g. made by PERUTEN Co. Amp-part type: PERUTOMETER-S3P, sensor part type: non-touching probe, FOCODIN) can be mentioned among others.

When the roughness of the said fine unevenness 9 has a wavelength finer than 5 $\mu$m of amplitude, 30 $\mu$m of wavelength, namely, the roughness of the said fine unevenness 9 is too fine, as is the afore-mentioned conventional example (b), it is not preferable because the beads pattern appears as a result of the roughness of the fine unevenness 9$d$ of the said range D being finer than the roughness of the fine unevenness 9$e$ of the other range E. And when exceeding 150 $\mu$m of amplitude, 600 $\mu$m of wavelength, namely, the roughness of the said fine unevenness 9 is too rough, conversely, it is also not preferable because the beads pattern of opposite contrast to the above-mentioned appears as a result of the roughness of the said fine unevenness 9$d$ being rougher than the said fine unevenness 9$e$.

Figure 13:
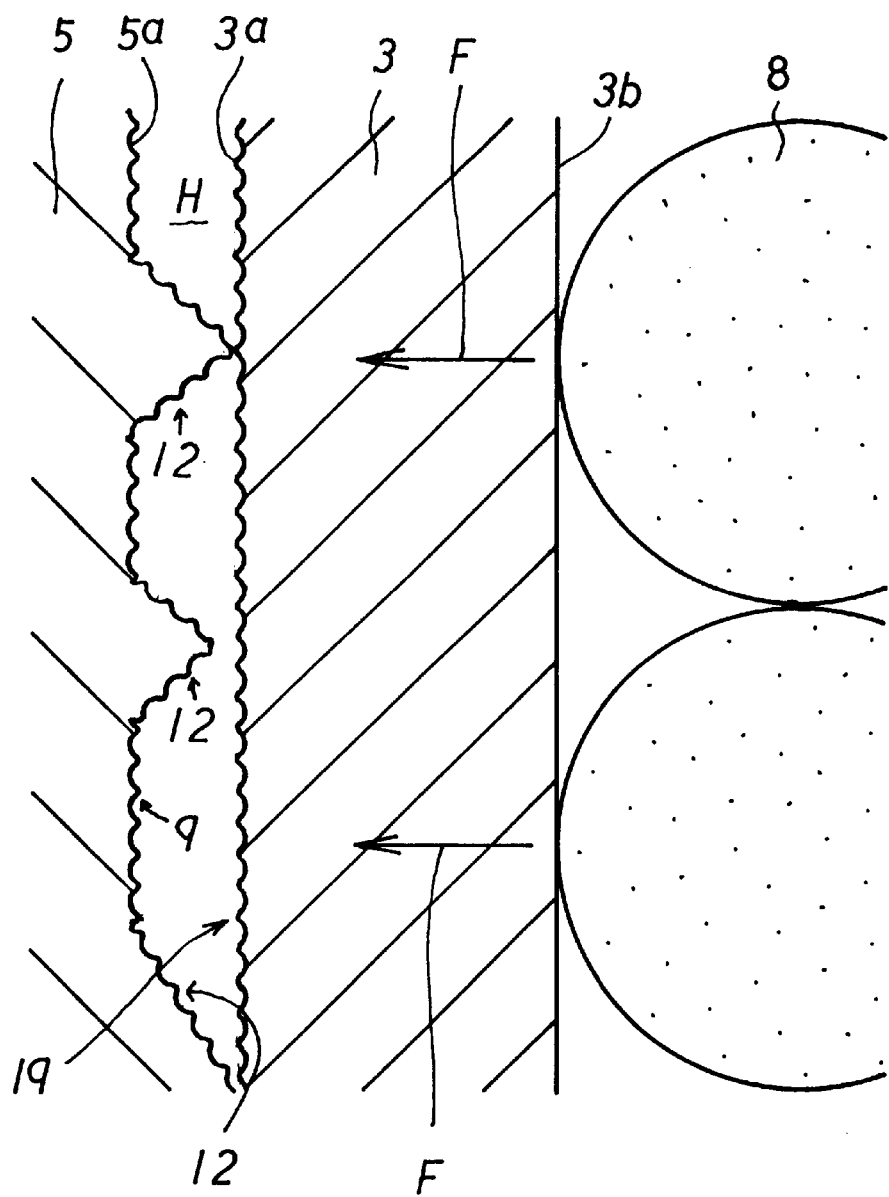
FIG. 13 is a side cross-sectional enlarged drawing of necessary part to show how expanded beads are cellular molded in a method for producing cellular molded article of synthetic resin having surface skin of the embodiment 3.
Figure 14:
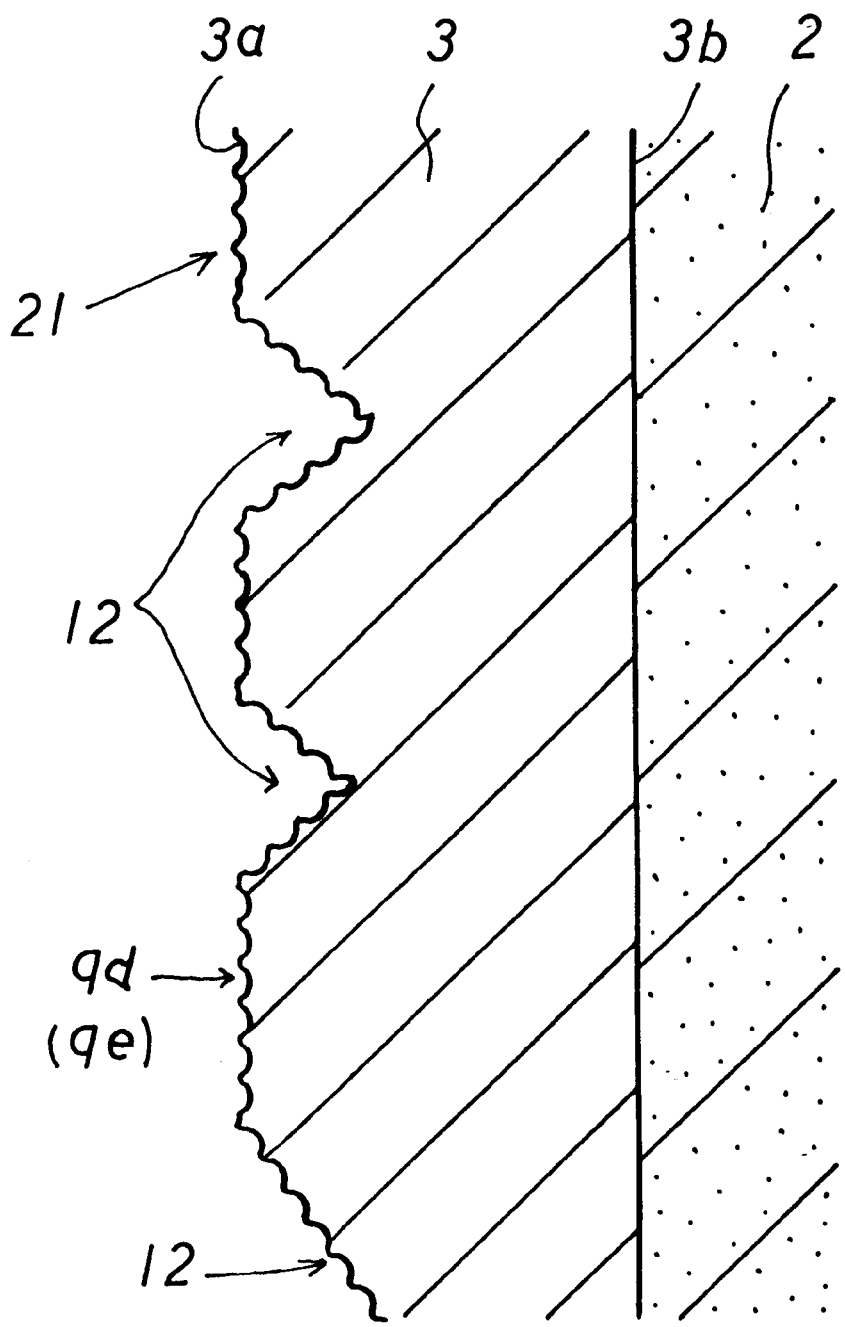
FIG. 14 is a side cross-sectional enlarged drawing of necessary part to show the vicinity of the surface of the obtained cellular molded article of synthetic resin having surface skin.

As shown in FIG. 13 and FIG. 14, a method for producing the cellular molded article of synthetic resin having surface skin 21 of the embodiment 3 is that in the said embodiment 2, unevenness 12 for the product design in addition to the said fine unevenness 9 is formed in advance on the surface 5$a$ of the said one mold part 5, and when printing the said fine unevenness 9 on the surface 3$a$ of the said thermoplastic resin skin material 3, the said unevenness for product design pattern 12 is also printed.

As the example of the said unevenness for product design pattern 12, a skin emboss can be mentioned among others. And the said fine unevenness 9 may be also formed on the surface of this unevenness for product design pattern 12. This unevenness for product design pattern 12 can be formed by utilizing various conventional techniques. When forming these unevenness for product design pattern 12 and fine unevenness 9 by etching, fine unevenness 9 is preferably formed after forming unevenness for product design pattern 12 to let the said unevenness for product design pattern 12 appear clearly.

And on account of forming the said unevenness for product design pattern 12, as shown in FIG. 13, even in the case of setting the said thermoplastic resin skin material 3 with the gap H to the surface 5$a$ of one mold part 5, since the whole thermoplastic resin skin material 3 is pressed against the said one mold part 5 at cellular molding the said expanded beads 8, the said unevenness for product design pattern 12 is printed on the surface 3$a$ of the said thermoplastic resin skin material 3, as shown in FIG. 14, and also the said fine unevenness 9 is printed and fine unevenness 9$d$ (9$e$) is formed by performing the same operation as the embodiment 2. Accordingly, as is the above-mentioned embodiment 2, when the roughness of the said fine unevenness 9 is made to be within the above-mentioned range the surface roughness of thermoplastic resin skin material 3 containing the said unevenness for product design pattern 12 is approximately kept in constant level.

Thus by forming the unevenness for product design pattern 12 in addition to the said fine unevenness 9 in advance on the surface 5$a$ of the said one mold part 5, the cellular molded article of synthetic resin 21 having unevenness for product design pattern 12 without residing beads pattern can be produced. Accordingly, the high-grade feeling or the like can be added to the cellular molded article of synthetic resin having surface skin 21.

Figure 15:
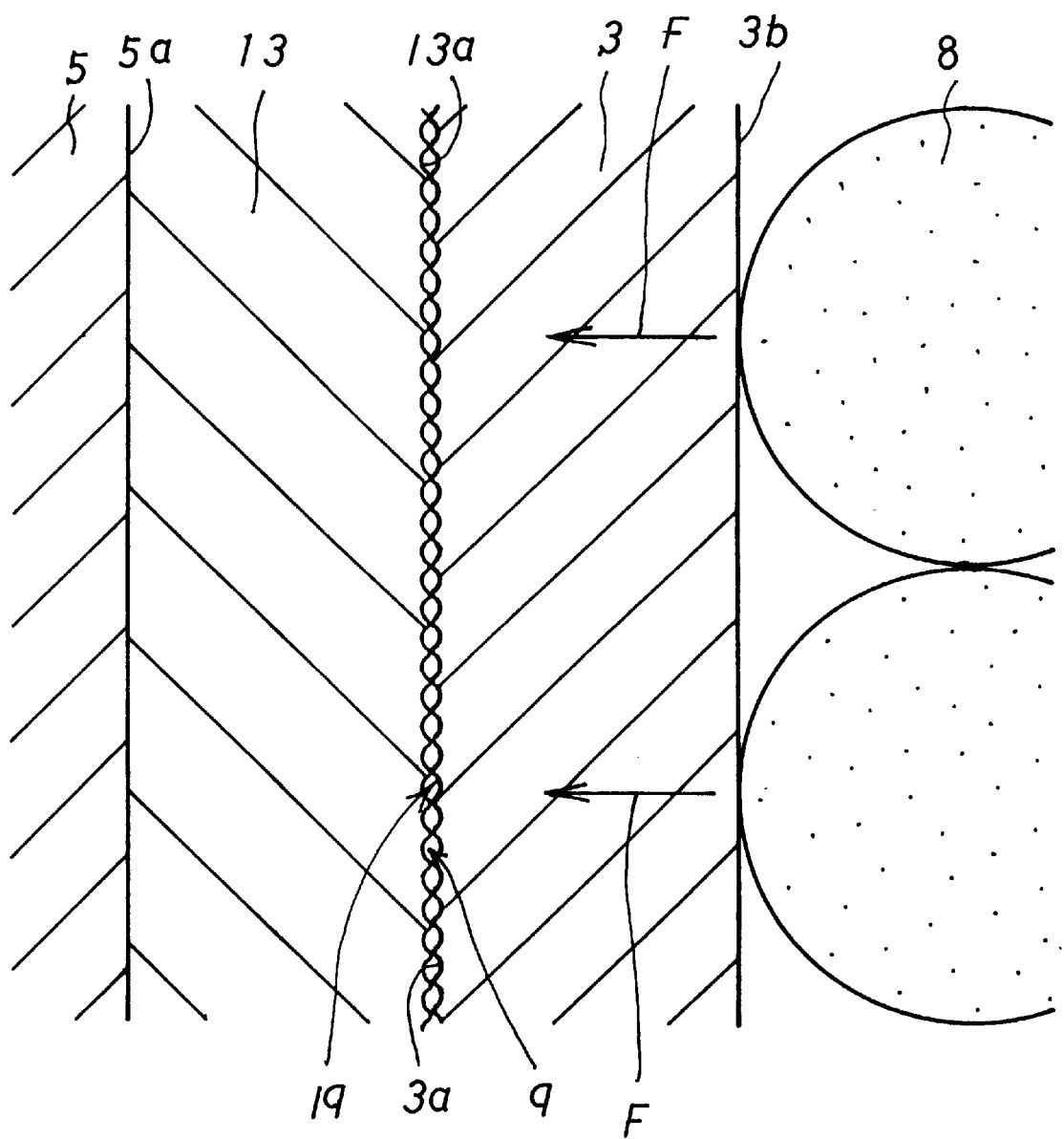
FIG. 15 is a side cross-sectional enlarged drawing of necessary part to show how expanded beads are cellular molded in a method for producing cellular molded article of synthetic resin having surface skin of the embodiment 4.

As shown in FIG. 15, a method for producing cellular molded article of synthetic resin having surface skin 1 of the embodiment 4 is that in the above-mentioned embodiment 2, the unevenness printing item material 13 is jointed in advance on the surface 5$a$ of the said one mold part 5, and when melt bonding the said expanded beads 8 together along with melt bonding and uniting these expanded beads 8 with the said thermoplastic resin skin material 3, the surface roughness of this thermoplastic resin skin material 3 is kept approximately kept in constant level by printing fine unevenness 9 formed on the surface 13$a$ of the said unevenness printing item material 13 on the surface 3$a$ of the thermoplastic resin skin material 3 to make the surface roughness of a prescribed range of thermoplastic resin skin material 3 which is pressed harder on the surface 13$a$ of unevenness printing material 13 with expanding force F of the said expanded beads 8 and the surface roughness of other range to be approximately the same.

As examples of the said unevenness printing item material 13, metal board, board of synthetic resin, sand cloth, sandpaper or water resistant sand paper, net plane material made by metal or synthetic resin can be mentioned among others. And the said unevenness printing item material 13 can be formed to fit the shape of the surface 5$a$ of the said one mold part 5, and on the surface 13$a$, the unevenness 9 can be formed by etching or blast or sticking micro particles or the like. Then with turning this fine unevenness 9 outside, the said unevenness printing item material 13 is stuck to the surface 5$a$ of the said one mold part 5 in advance by adhesion of adhesive or the like or magnetic sticking. The time of forming the said fine unevenness 9 and the time of forming this unevenness printing item material 13 to fit the shape of the surface 5$a$ of the said one mold part 5 are not particularly limited. And plurality of connecting holes or the like getting through the decompressing hole 5$c$ of the said one mold part 5 can be formed if necessary.

Thus in the case of attaching the said unevenness printing item material 13 on the surface 5$a$ of one mold part 5, by operating as above-mentioned, the cellular molded article of synthetic resin having surface skin 1 as the embodiment 2 can be produced. Therefore, advantages are that the present facility can be utilized as it is and when this unevenness printing item material 13 is to be removable, also advantage is that it can be utilized in various kinds of facilities.

And in this embodiment, the case when fine unevenness 9 is formed on the surface 13$a$ of the said unevenness printing item material 13 is explained, however, the scope of this invention is not limited to this, the unevenness for product design pattern 12 in addition to the said fine unevenness 9 can be formed on the surface 13$a$ of the unevenness printing item material materials 13 as the said embodiment 3.

Figure 16:
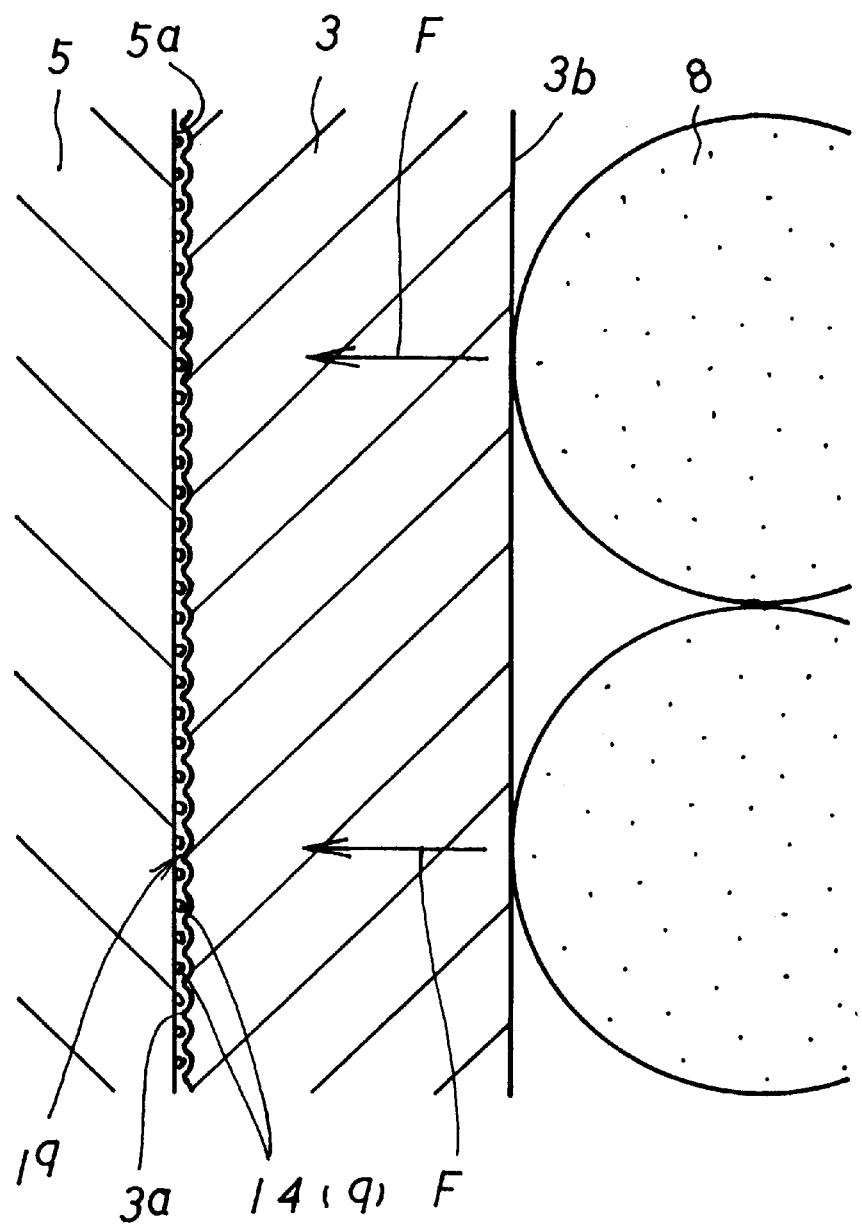
FIG. 16 is a side cross-sectional enlarged drawing of necessary part to show how expanded beads are cellular molded in a method for producing cellular molded article of synthetic resin having surface skin of the embodiment 5.

As shown in FIG. 16, a method for producing the cellular molded article of synthetic resin having surface skin 1 of the embodiment 5 is that in the above-mentioned embodiment 2, after smoothing the surface 5$a$ of the said one mold part 5 on which fine unevenness 9 of the same roughness as the above is formed in advance by sticking unevenness printing particle substance 14, the surface roughness of this thermoplastic resin skin material 3 is approximately kept in constant level by printing the said fine unevenness 9 to the surface 3$a$ of the thermoplastic resin skin material 3 to make the surface roughness of thermoplastic resin skin material 3 of a prescribed range which is pressed harder with expanding force F of the said expanded beads 8 and the surface roughness of other range to be approximately the same when melt bonding of the said expanded beads 8 together and melt bonding and uniting these expanded beads 8 with the said thermoplastic resin skin material 3.

As example of the said unevenness printing particle substance 14, metal powder or the like can be mentioned, and the said unevenness printing particle substance 14 can be stuck to the surface 5$a$ of the said one mold part 5 by adhesion of adhesives or the like or magnetic sticking. As for its particle size, the roughness of fine unevenness 9 formed by this unevenness printing particle substance 14 can have waveshape in which amplitude is 5 to 150 μm, wavelength is 30 to 600 μm measured by the afore-mentioned surface roughness measuring instrument.

Thus when forming fine unevenness 9 on the surface 5a of the one mold part 5 by utilizing the said unevenness particle substance 14, as the above-mentioned embodiment 4, the cellular molded article of synthetic resin having surface skin 1 as in the embodiment 2 can be produced. Therefore, advantage is that the present facility can be utilized as it is.

And in this embodiment, the case when fine unevenness 9 is formed on the surface 5a of the said one mold part 5 by the said unevenness printing particle substance 14, is explained, however, the scope of this invention is not limited to this, and as in the said embodiment 3, unevenness for product design pattern 12 in addition to the fine unevenness 9 formed by the said unevenness printing particle substance 14 can be formed on the surface 5a of the said one mold part 5.

Figure 17:
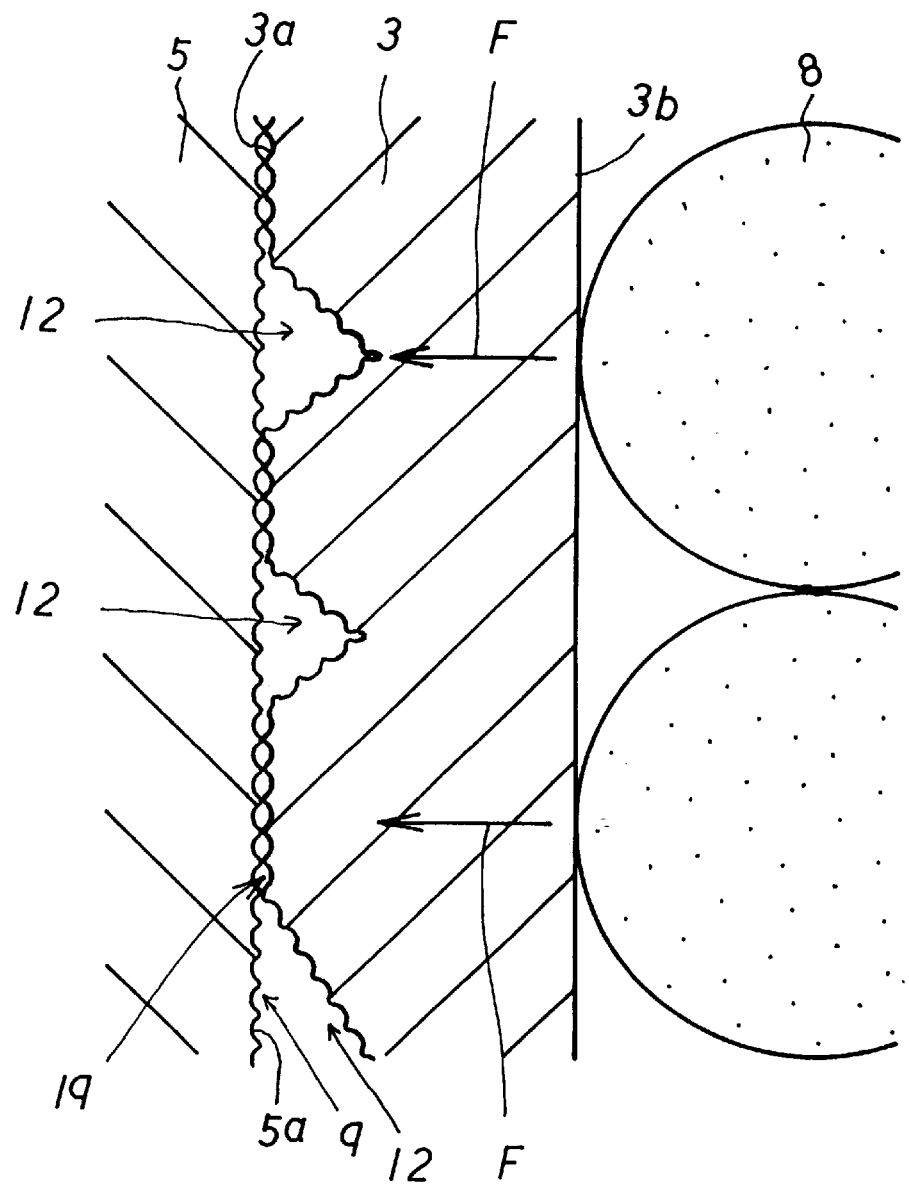
FIG. 17 is a side cross-sectional enlarged drawing of necessary part to show how expanded beads are cellular molded in a method for producing cellular molded article of synthetic resin having surface skin of the embodiment 6.

As shown in FIG. 17, a method for producing cellular molded article of synthetic resin having surface skin 21 of the embodiment 6 is that in the above-mentioned embodiment 2, the unevenness for product design pattern 12 is formed in advance on the surface 3a of the thermoplastic resin skin material 3 before setting the thermoplastic resin skin material 3 on the said one mold part 5.

Figure 18:
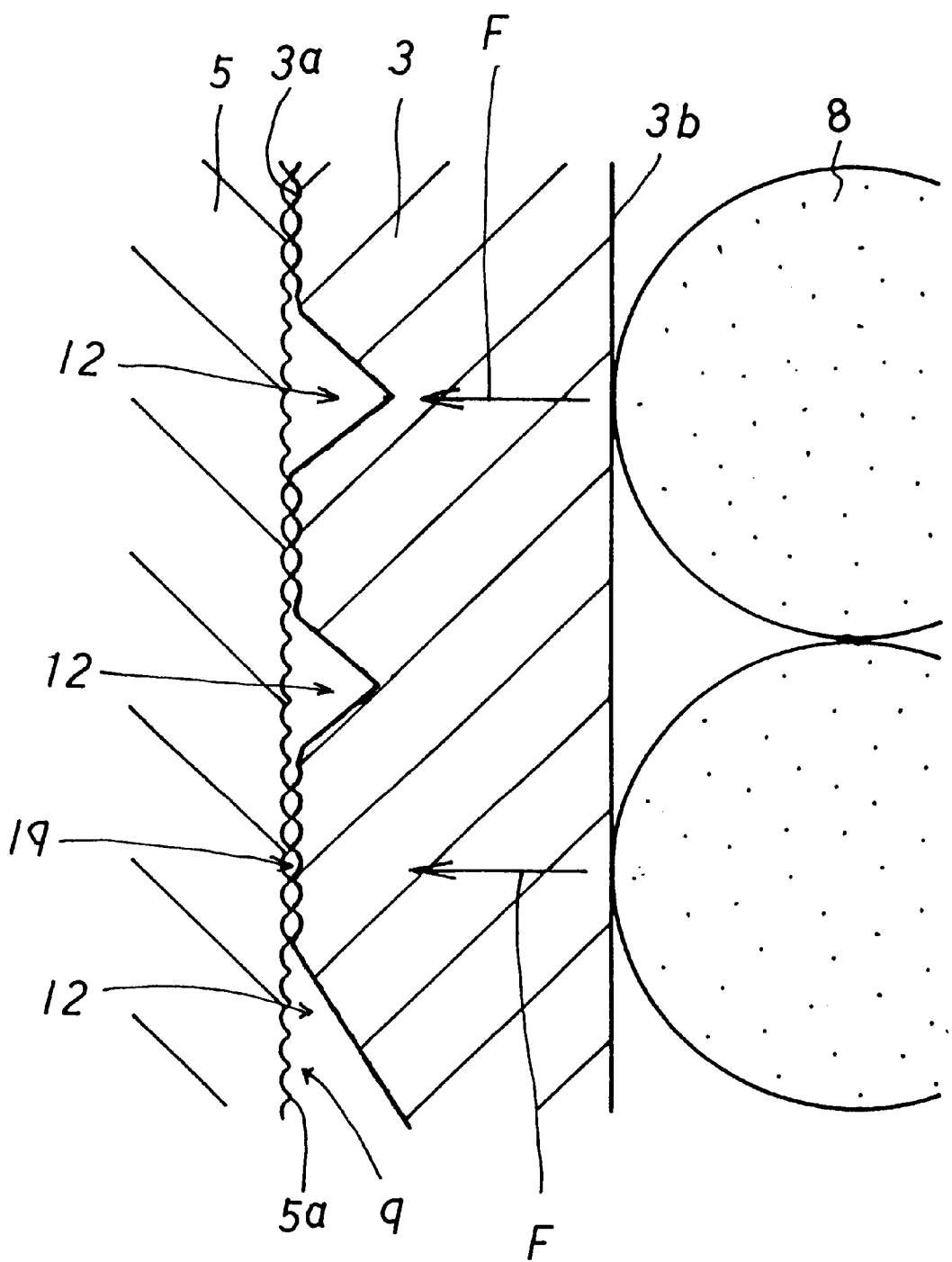
FIG. 18 is the same side cross-sectional enlarged drawing of necessary part as FIG. 17 except the surface of the unevenness for product design pattern is approximately smoothed.

As the methods for forming the unevenness for product design pattern 12 on the surface 3a of the said thermoplastic resin skin material 3, for example, various conventional methods such as a method using embossing machine can be utilized. And the surface of the said unevenness for product design pattern 12 can be formed to fine unevenness 19 by mat processing as this embodiment or can be smoothed as shown in FIG. 18.

As shown in FIG. 17, by operating as the said embodiment 2 after setting this thermoplastic resin skin material 3 on the surface 5a of the said one mold part 5, the said fine unevenness 9 is printed on the surface 3a of the thermoplastic resin skin material 3 to make the surface roughness of thermoplastic resin skin material 3 of a prescribed range which is pressed harder on surface 5a of one mold part 5 with expanding force F of the said expanded beads 8 and the surface roughness of other range to be approximately the same. Consequently, the cellular molded article of synthetic resin having surface skin 21 as in the above-mentioned embodiment 3 shown in FIG. 14 can be produced.

Thus, even when unevenness for product design pattern 12 is formed in advance on the surface 3a of the said thermoplastic resin skin material 3, as in the above-mentioned embodiment 3, advantages are that the appearance of the obtained cellular molded article of synthetic resin having surface skin 21 is excellent, and high-grade feeling or the like can be added by the said unevenness for product design pattern 12. Moreover, since it is not necessary to form unevenness for product design pattern 12 on the surface 5a of the said one mold part 5, the cost can be reduced.

And in this embodiment, the case when thermoplastic resin skin material 3 having the said unevenness for product design pattern 12 is set on the one mold part 5 having fine unevenness 9 on the surface 5a is explained, however, the scope of this invention is not limited to this. As shown in the above-mentioned embodiment 4 or 5, the said thermoplastic resin skin material 3 can be set on the unevenness printing item material 13 attaching to the surface 5a of the said one mold part 5 or can be set on the surface 5a of the one mold part 5 having fine unevenness 9 formed by the said unevenness printing particle substance 14.

In the embodiment 1 to 6, the case when the said one mold part 5 is concave mold (female type) whose horizontal section is made concave is explained, however the scope of this invention is not limited to this, a mold comprising of one mold part 5 being convex mold (male type) whose horizontal section is convex shape and the said other mold part 6 being concave mold (female type) whose horizontal section is concave shape can be also used.

Next, the case of so-called afterward stuck molding is described.

As shown in FIGS. 19 to 25, a method for producing cellular molded article of synthetic resin having surface skin 31 of the embodiment 7 is that in a method for producing cellular molded article of synthetic resin having surface skin 31 in which cellular molded article of synthetic resin 2 and thermoplastic resin skin material 3 are set between two mold parts 15,16 and when clamping the two mold parts and pressurizing them, these cellular molded article of synthetic resin 2 and thermoplastic resin skin material 3 are melt bonded and united, for example, by heat, fine unevenness 9 of the same roughness as the above-mentioned embodiment 2 is formed in advance on the surface 15a of one mold part 15 which will come in contact with the said thermoplastic resin skin material 3, and when melt bonding and uniting the said cellular molded article of synthetic resin 2 with the said thermoplastic resin skin material 3, by printing the said fine unevenness 9 to make the surface roughness of thermoplastic resin skin material 3 of prescribed range D which is pressed harder on the surface 15a of the said one mold part 15 with pressurizing force G and the surface roughness of the other range E to be approximately the same on the surface 3a of the thermoplastic resin skin material 3, the surface roughness of this thermoplastic resin skin material 3 is approximately kept in constant level.

Figure 19:
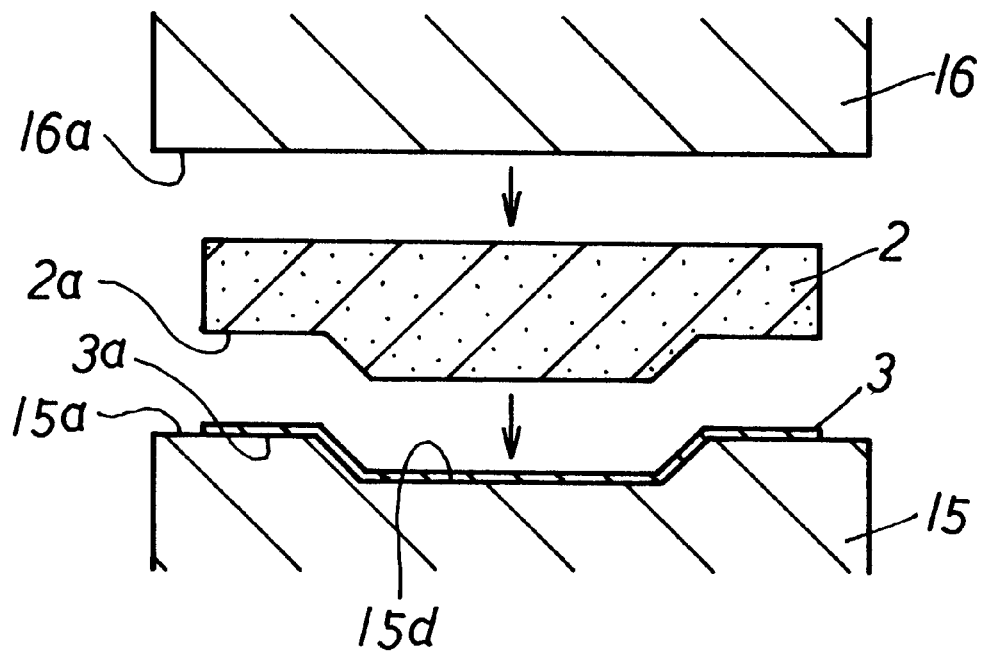
FIG. 19 is a side cross-sectional drawing showing the way of damping with setting cellular molded article of synthetic resin and thermoplastic resin skin material in between two mold parts in a method for producing cellular molded article of synthetic resin having surface skin of the embodiment 7.
Figure 20:
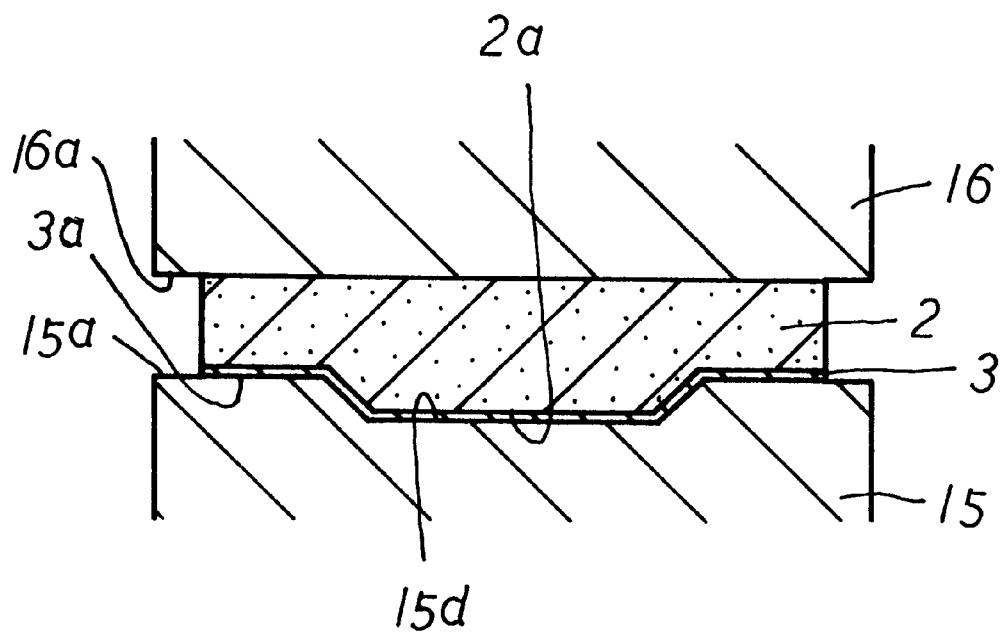
FIG. 20 is a side cross-sectional enlarged drawing of necessary part to show the state after clamping.

More precisely, as shown in FIG. 19, at the start, cellular molded article of synthetic resin 2 and thermoplastic resin skin material 3 are set between the said two mold parts 15,16, and as shown in FIG. 20, the mold parts are clamped.

The said two mold parts 15,16, for example, can be opened and clamped with a vertical motion, one mold part 15 which will come in contact with the said thermoplastic resin skin material 3 is set to be the lower mold part and the other mold part 16 which will come in contact with the said cellular molded article of synthetic resin 2 is set to be the upper mold part. And concave mold part 15d is formed to fit the shape of the surface 2a of the said cellular molded article of synthetic resin 2 on the surface 15a of the said one mold part 15, and the surface 16a of the said the other mold part 16 is smoothed. Moreover, at least the said one mold part 15 can be optionally made to be heated up to a prescribed temperature by steam, electric heating element or the like.

The said cellular molded article of synthetic resin 2 is formed to be a prescribed shape in advance by cellular molding of the said expanded beads 8.

Figure 21:
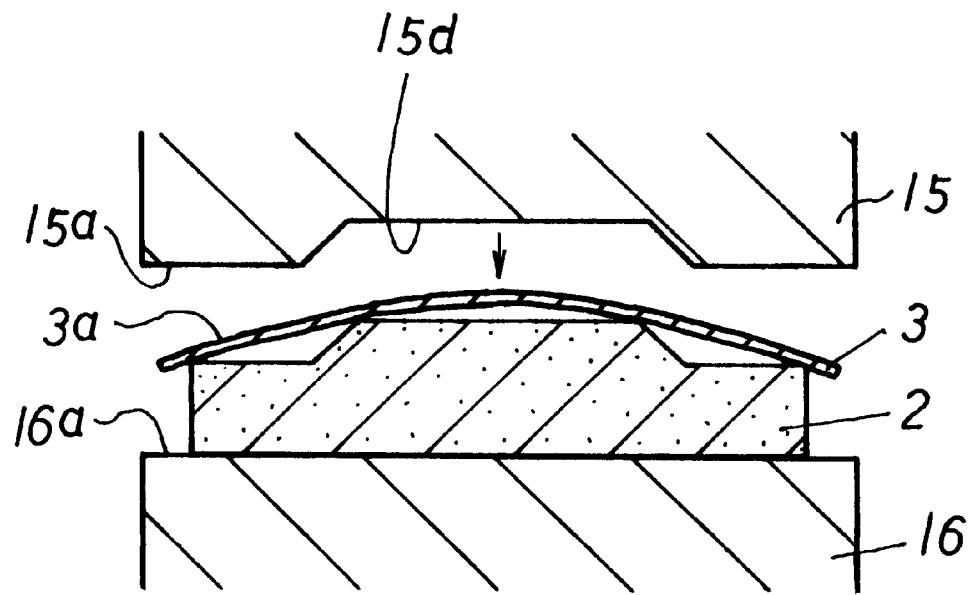
FIG. 21 is a side cross-sectional drawing showing the way of clamping with setting thermoplastic resin skin material on the cellular molded article of synthetic resin between in two mold parts with one of the parts being the upper part, and the other being the lower part.
Figure 22:
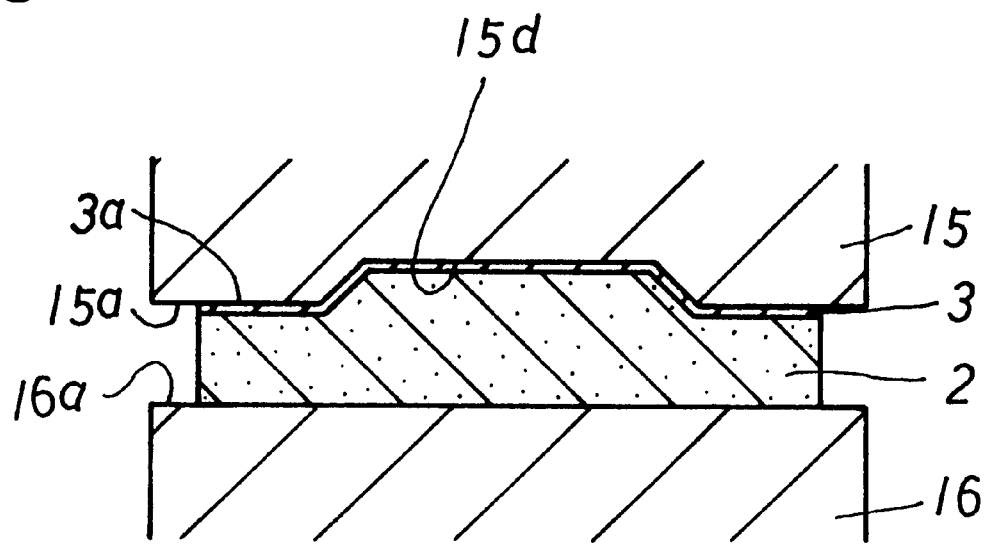
FIG. 22 is a side cross-sectional enlarged drawing of necessary part to show the state after clamping.

In order to set the said thermoplastic resin skin material 3, for example, the thermoplastic resin skin material 3 can be formed in advance to fit the shape of the surface 15a of the said one mold part 15 by vacuum forming or the like using other molding chamber or the like. Alternatively, without pre-forming or the like, for example, as shown in FIGS. 21 and 22, the said one part 15 is made to be the upper mold part and the said the other part 16 is made to be the lower mold part and the said thermoplastic resin skin material 3 can be set on top of the cellular molded article of synthetic resin 2. In this case, when clamping and pressurizing the two mold parts 15,16 as shown in FIG. 22, the two mold parts 15,16 are preferably heated up for easy forming.

Figure 23:
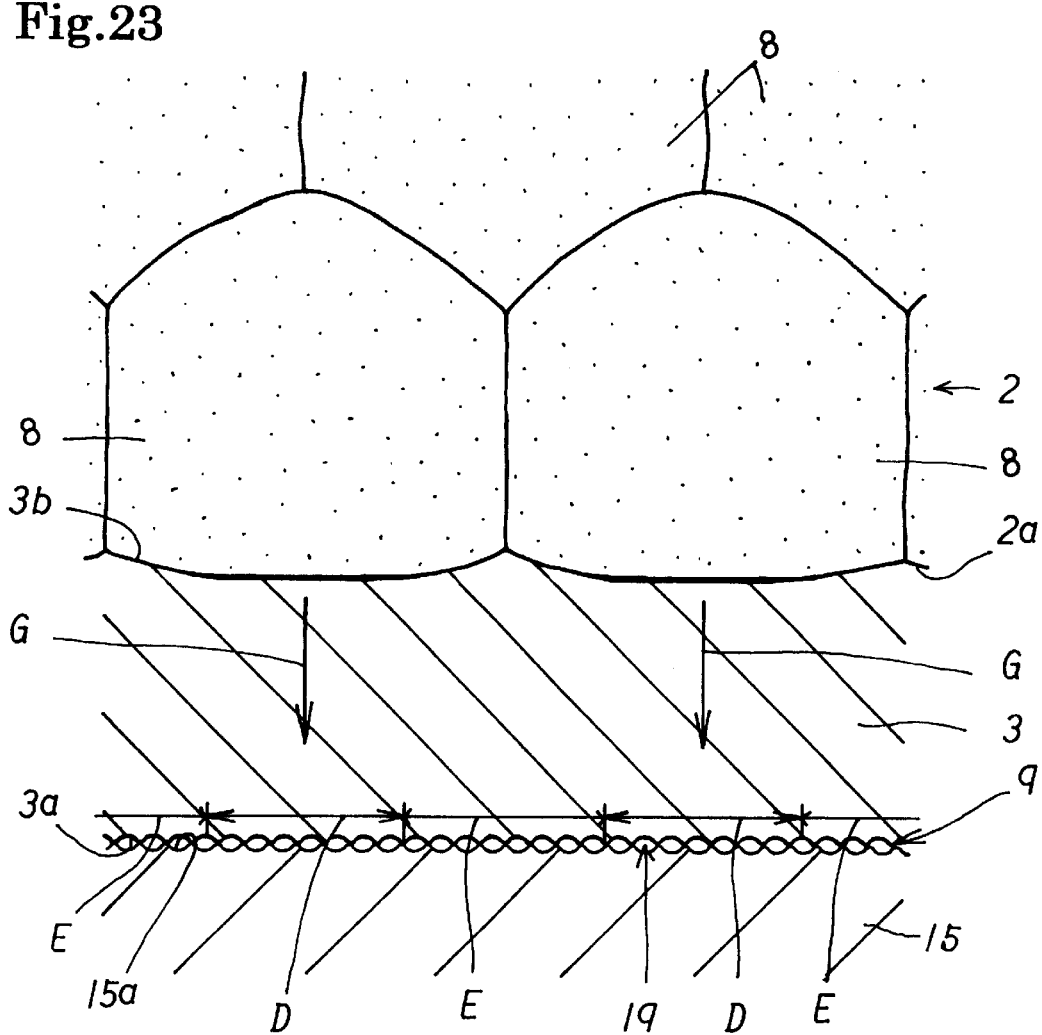
FIG. 23 is a side cross-sectional enlarged drawing of necessary part to show the way of melt bonding and uniting cellular molded article of synthetic resin with thermoplastic resin skin material by heat when pressurizing them in the condition of FIG. 20.

Next, as shown in FIG. 23, in the condition of FIG. 20, when pressurizing the mold by pressurizing force G, the said cellular molded article of synthetic resin 2 and thermoplastic resin skin material 3 are melt bonded and united by heat. In this case, the heating can be performed in any time selected from before setting cellular molded article of synthetic resin 2 and thermoplastic resin skin material 3, after setting these materials, after clamping the mold, after pressurizing the mold or at the same time as setting, clamping or pressurizing. Possibly, the heating may be performed in advance to a prescribed temperature, and at a prescribed stage, temperature may be raised to the temperature at which cellular molded article of synthetic resin 2 and thermoplastic resin skin material 3 are melt bonded. Possibly, the heating may be performed in advance up to at a temperature higher than the temperature at which these cellular molded article of synthetic resin 2 and thermoplastic resin skin material 3 are melt bonded and at a prescribed stage the heating may be stopped and melt bonding may be performed by the kept heat. In any method, it is important to be able to melt bond and unite cellular molded article of synthetic resin 2 and thermoplastic resin skin material 3 at pressurizing.

Figure 24:
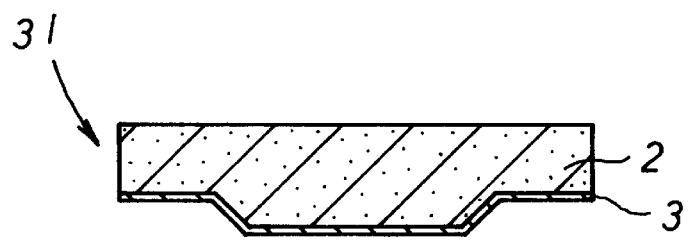
FIG. 24 is a side cross-sectional drawing of the obtained cellular molded article of synthetic resin having surface skin.

And when the mold parts are opened after cooling or the like, as shown in FIG. 24, cellular molded article of synthetic resin having surface skin 31 canbe obtained.

Moreover, fine unevenness 19 is formed in advance on the surface 3a of the said thermoplastic resin skin material 3 by mat processing with a prescribed roughness as is in the normal condition as shown in FIG. 23. And fine roughness 9 having 5 to 150 $\mu$m of amplitude, 30 to 600 $\mu$m of wavelength of surface roughness waveshape measured by the said surface roughness measuring instrument is formed in advance on the surface 15a of the said one mold part 15.

Figure 25:
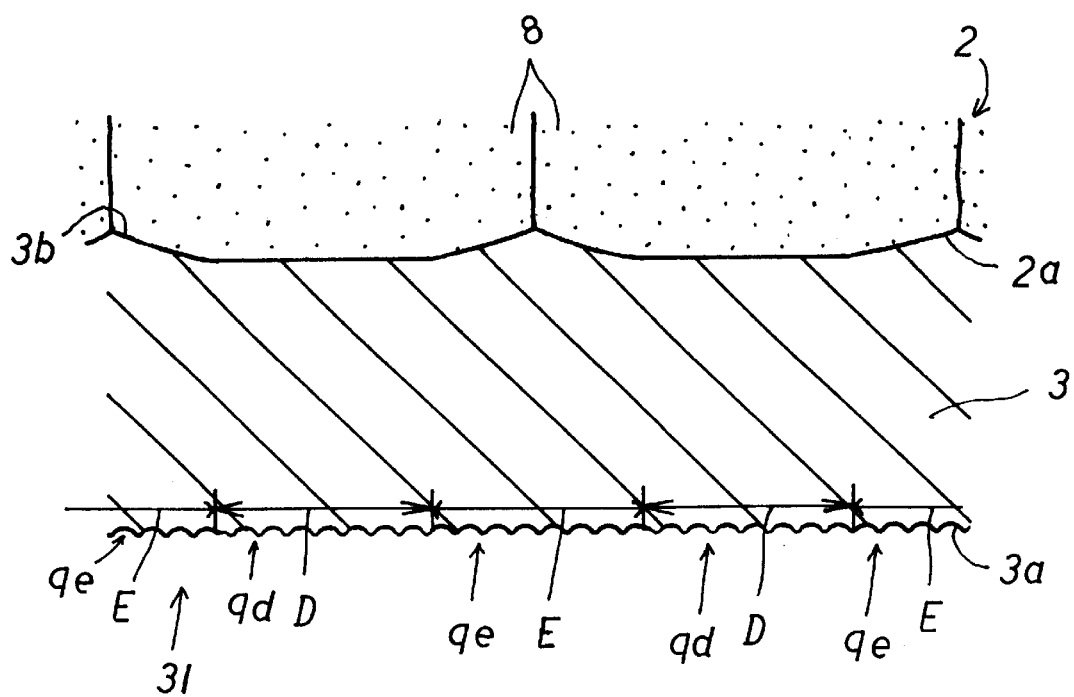
FIG. 25 is a side cross-sectional enlarged drawing of necessary part to show the vicinity of the surface of cellular molded article of synthetic resin having surface skin of FIG. 24.

In this case, since the surface 2a of the said cellular molded article of synthetic resin 2 is not smoothed, by pressurizing force G, a prescribed range D of the surface 3a of the said thermoplastic resin skin material 3 is pressed harder than the other range E against the surface 15a of the said one mold part 15 from the backside 3b. In this case, as the above-mentioned embodiment 2, since the said thermoplastic resin skin material 3 is softened by heat in this condition, as shown in FIG. 25, by printing the said fine unevenness 9 formed in advance on the surface 15a of the said one mold part 15, fine unevenness 9d is formed in the said range D.

Also, since the said the other range E is pressed against the surface 15a of the said one mold part 15 by a force smaller than the force to the range D, the said fine unevenness 9e is formed in this the other range E by printing the said fine unevenness 9. In this case, also, since the roughness of the said fine unevenness 9 is made to be in the above-mentioend range, the roughness of the said fine unevenness 9d, 9e can be approximately the same level. Consequently, the surface roughness of the said thermoplastic resin skin material 3 is approximately kept in constant level, and it is advantageous that the previous beads pattern does not appear and that appearance of its product can be improved more.

Figure 26:
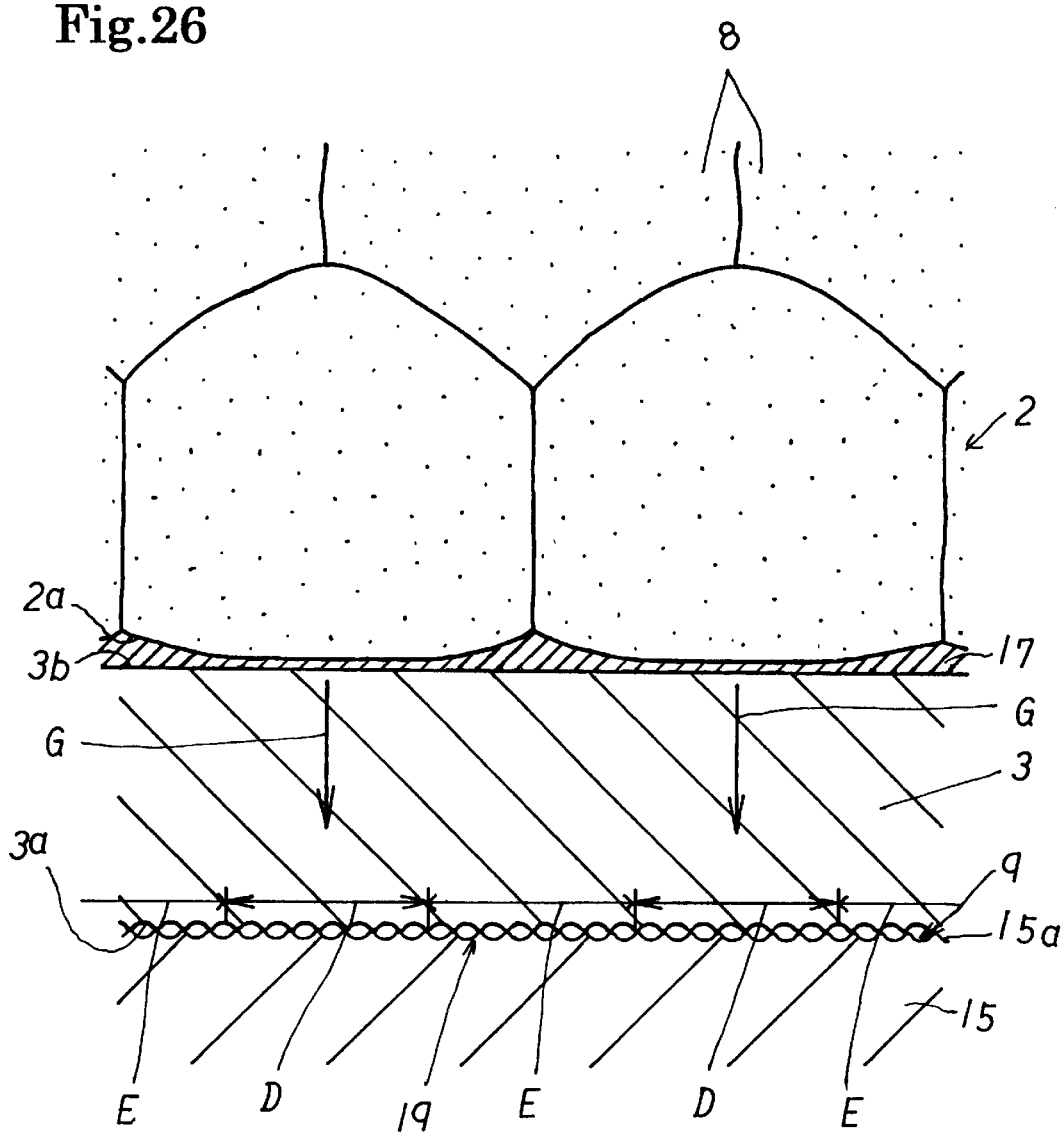
FIG. 26 is a side cross-sectional enlarged drawing of necessary part to show how cellular molded article of synthetic resin is melt bonded and united with thermoplastic resin skin material by both heat and adhesive in a method for producing cellular molded synthetic resin having surface skin of the embodiment 8.
Figure 27:
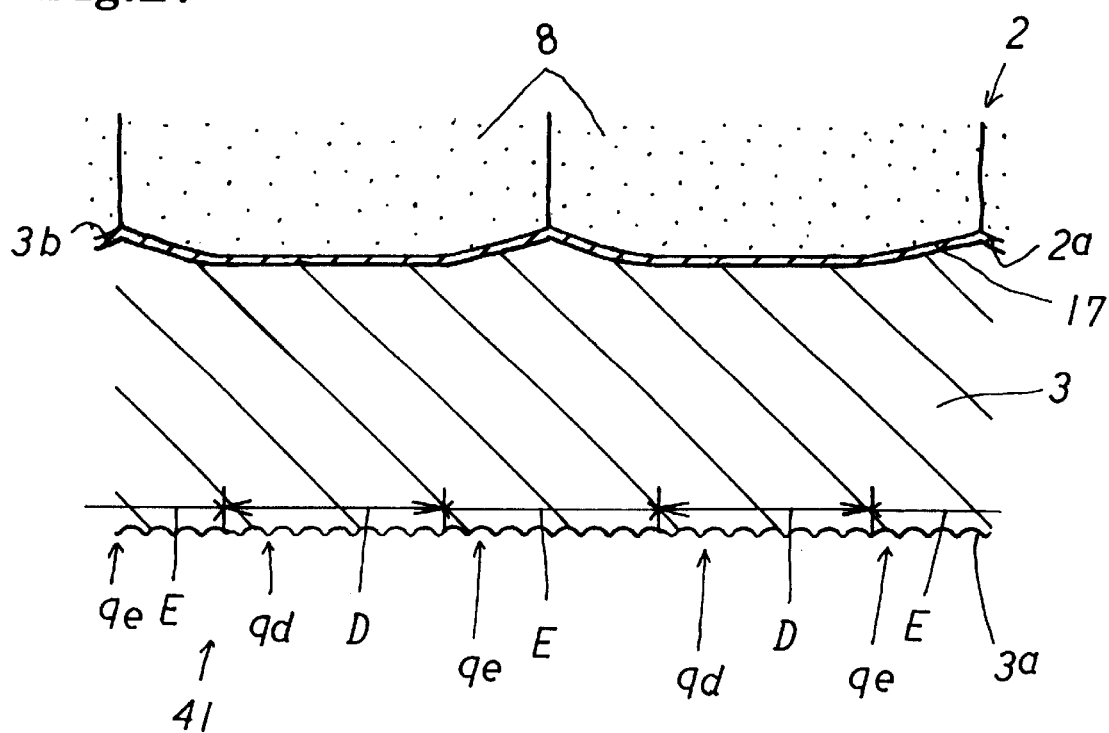
FIG. 27 is a side cross-sectional enlarged drawing of necessary part to show the vicinity of the surface of the obtained cellular molded article of synthetic resin having surface skin.
Figure 28:
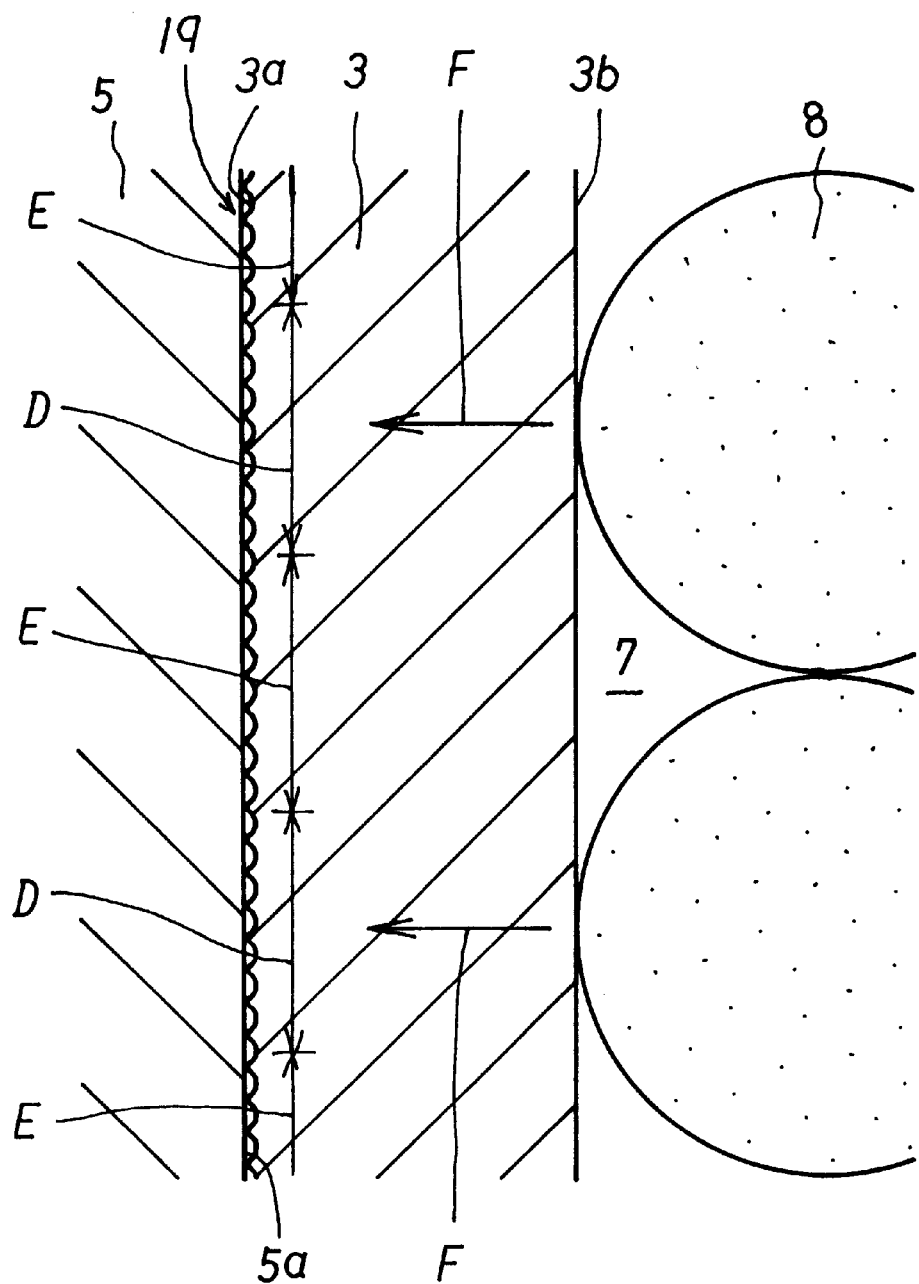
FIG. 28 is a side cross-sectional enlarged drawing of necessary part to show how expanded beads are cellular molded in a conventional method (b).
Figure 29:
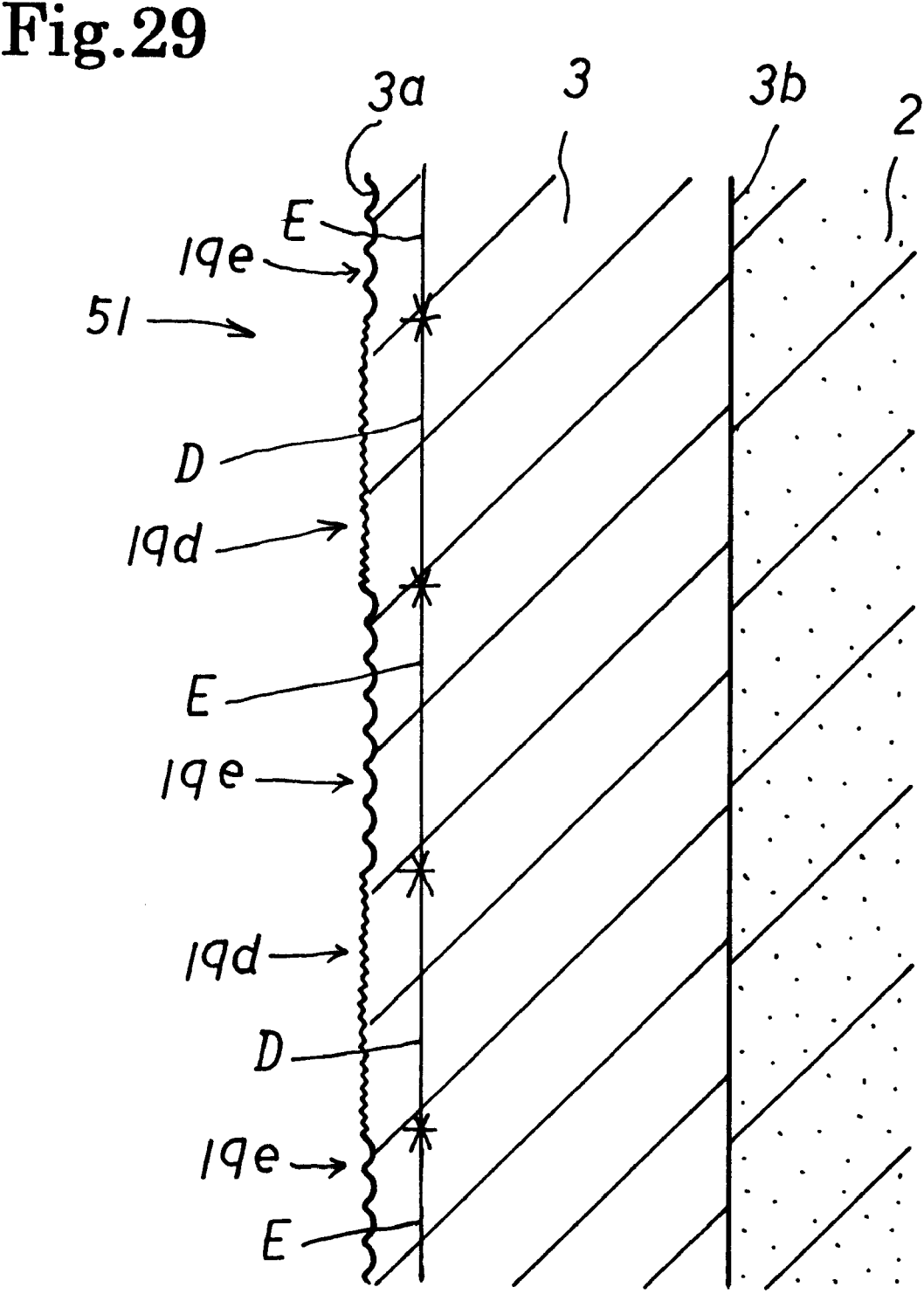
FIG. 29 is a side cross-sectional enlarged drawing of necessary part to show how is the beads pattern formed on the surface of the obtained cellular molded article of synthetic resin having surface skin.
Figure 30:
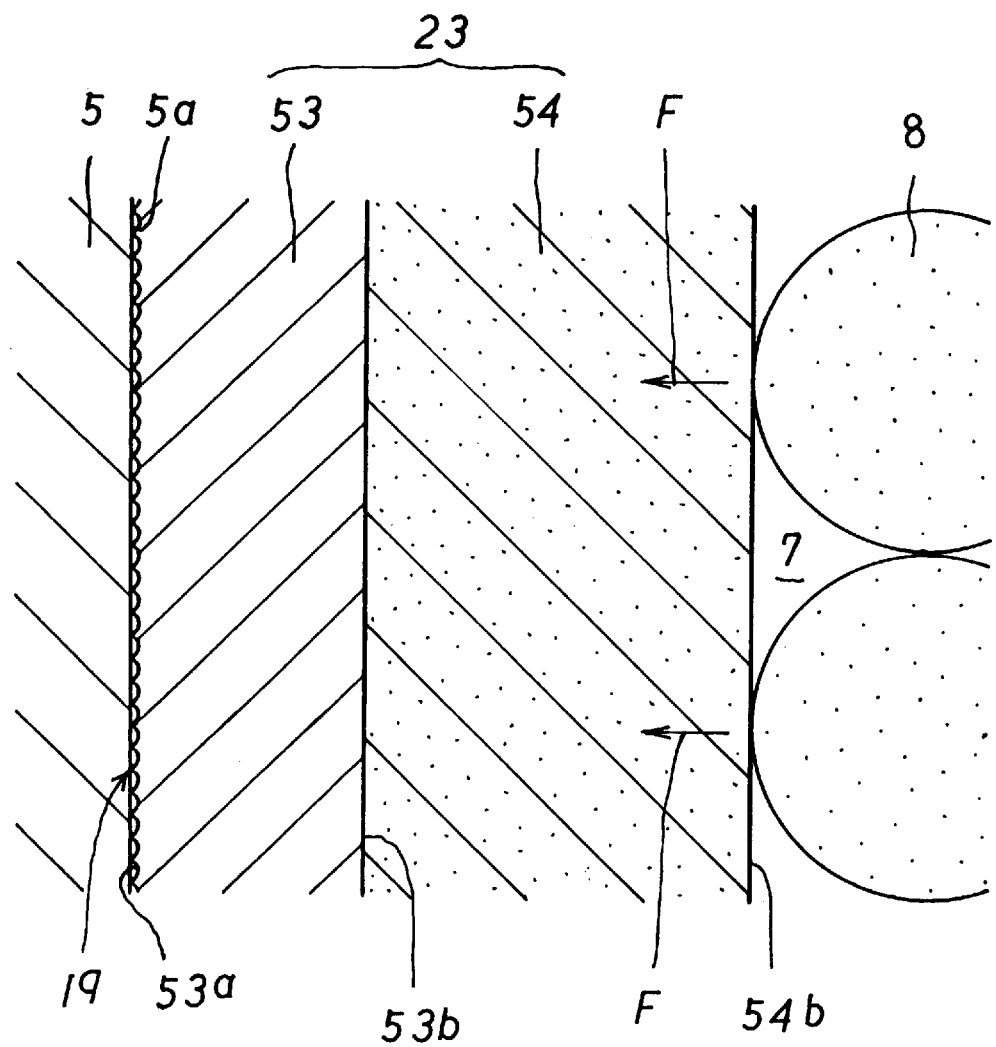
FIG. 30 is a side cross-sectional enlarged drawing of necessary part to show how expanded beads are cellular molded in a conventional example (c).
Figure 31:
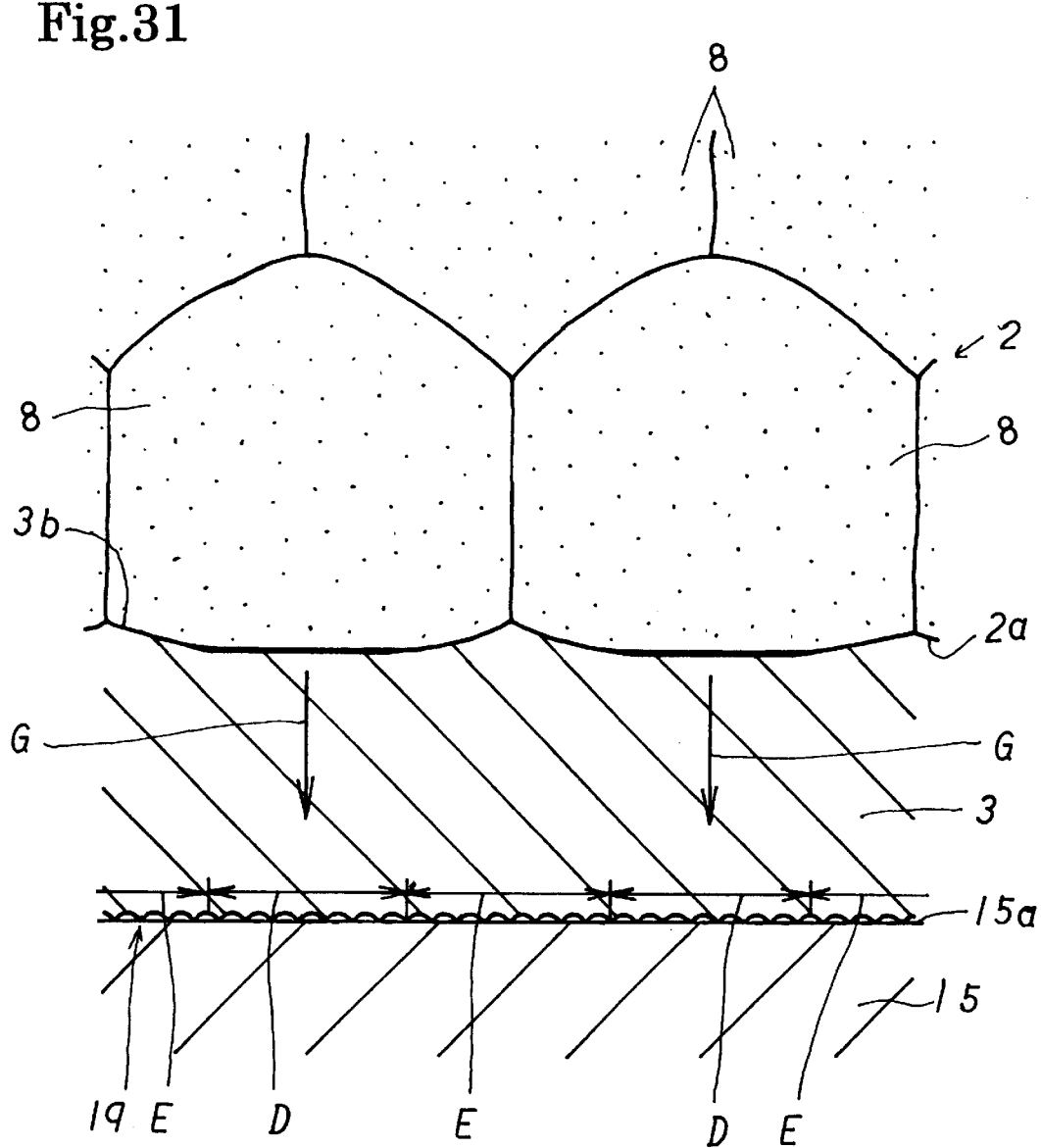
FIG. 31 is a side cross-sectional enlarged drawing of necessary part to show how cellular molded article of synthetic resin is melt bonded and united with thermoplastic resin skin material by heat when clamping mold parts and pressurizing them in a conventional method (d).

As shown in FIGS. 26 and 27, a method for producing cellular molded article of synthetic resin having surface skin 41 of the embodiment 8 is that in the above-mentioned embodiment 7, with putting adhesive 17 between the said cellular molded article of synthetic resin 2 and thermoplastic resin skin material 3, the melt bonding and uniting the cellular molded article of synthetic resin 2 and thermoplastic resin skin material 3 by both heat and adhesive 17.

As the example of the said adhesive 17, as is in the case of the said simultaneous united molding, for example, a synthetic resin dissolved in an organic solvent, a resin emulsion, a resin powder or the like can be mentioned. This adhesive 17 may be applied in advance to the backside 3b of the thermoplastic resin skin material 3 or the surface 2a of the said cellular molded article of synthetic resin 2.

In the case of using a method in which the said cellular molded article of synthetic resin 2 and thermoplastic resin skin material 3 are set between two mold parts 15,16 and when clamping and pressurizing two mold parts, these are melt bonded and united by heat and adhesive, as shown in FIG. 26, as is the above-mentioned the embodiment 7, since the surface 2a of the said cellular molded article of synthetic resin 2 is not smoothed, the prescribed range D of the surface 3a of the said thermoplastic resin skin material 3 is pressed harder than the other range E by pressurizing force G. Therefore, as shown in FIG. 27, by printing fine unevenness 9 on the surface 3a of this thermoplastic resin skin material 3, fine unevenness 9d, 9e are formed. Since the said fine unevenness 9 is made to be in the above-mentioned range, the roughness of fine unevenness 9d, 9e can be made to be about the same. Consequently, the beads pattern does not appear.

Thus, when using the said adhesive 17, the adhesiveness between the said cellular molded article of synthetic resin 2 and thermoplastic resin skin material 3 can be improved. And when using the suitable adhesive 17, adhering can be performed even at a temperature below melting point of the said cellular molded article of synthetic resin 2. Therefore, advantage is that heating to so high temperature is not needed.

And in this embodiment, cellular molded article of synthetic resin 2 and thermoplastic resin skin material 3 are melt bonded and united by both heat and adhesive 17, however, the scope of this invention is not limited to this, these can be bonded and united by adhesive 17 without heat. As adhesive 17 in this case, adhesive which has adhesiveness at a room temperature or which cures at room temperature or the like can be used. Thus when uniting by adhesive 17, as is above-mentioned, fine unevenness of approximately the same roughness 9d, 9e are formed on the surface 3a of the said thermoplastic resin skin material 3 by pressurizing force G. Consequently, the beads pattern does not appear.

And in the embodiment 7 and 8, the said two mold parts 15,16 are made to be opened and clamped with a vertical motion, however, the scope of this invention is not limited to this, and the mold parts also can be opened and clamped with a horizontal motion.

And the case when fine unevenness 9 is formed on the surface 15a of the said one mold part 15 is described, however, the scope of this invention is not limited to this, as is the above-mentioned embodiments 3 to 6, unevenness for product design pattern 12 in addition to the said fine unevenness 9 can be formed in advance on the surface 15a of the said one mold part 15 or unevenness for product design pattern 12 can be formed in advance on the surface 3a of the said thermoplastic resin skin material 3. Furthermore, the said unevenness printing item material 13 can be used or the said fine unevenness 9 can be formed by unevenness printing particle substance 14.

As above-mentioned, in the embodiments 2 to 8, the case when the surface 3a of the said thermoplastic resin skin material 3 is mat processed with an appropriate roughness is described, but the surface roughness of this thermoplastic resin skin material 3 is not particularly limited to this, it can also be applied to very rough or very fine.

That means, even in the case of being very rough or very fine, by making the roughness of the said fine unevenness 9 to be adjusted to about the same as the original surface roughness of the said thermoplastic resin skin material 3 in advance, the roughness of the fine unevenness 9d, 9e formed in the said range D and the other range E respectively at the said simultaneous united molding or afterward attached molding can be made to about the same. Consequently, the surface roughness of the said thermoplastic resin skin material 3 is approximately kept in constant level, and the previous beads pattern does not appear. Therefore, advantage is that various kinds of thermoplastic resin skin material 3 can be used.

Here, the roughness of the said fine unevenness 9 and the surface roughness of the said thermoplastic resin skin material 3 are most preferably the same. However, when these are not the same, the difference of waveshape between them is not more than 50 $\mu$m of amplitude, not more than 200 $\mu$m of wavelength, preferably not more than 40 $\mu$m of amplitude, not more than 150 $\mu$m of wavelength, more preferably not more than 30 $\mu$m of amplitude, not more than 100 $\mu$m of wavelength measured by surface roughness measuring instrument. And in this case either one of them can be rougher than the other.

The difference mentioned here is decided by comparing the amplitude and wavelength respectively, and means the maximum value calculated by the differences of both amplitude and wavelength becoming maximum.

When the said difference is within the above mentioned range, the roughness of the said fine unevenness 9d, 9e formed on the surface 3a of the said thermoplastic resin skin material 3 by printing the said fine unevenness 9 can be approximately the same for certain. Consequently, advantage is that the appearance of the product can be improved still more efficiently. And when the surface roughness of the said one mold part 5 and thermoplastic resin skin material 3 are the same or very similar, naturally printing the said fine unevenness 9 is not necessarily essential to achieve the above mentioned object which aims not to appear the beads pattern. Whereas, for example, when unevenness for product design pattern 12 such as skin emboss is formed on the surface 5a of the said one mold part 5, printing this unevenness for product design pattern 12 is essential, and the cases when printing the said fine unevenness 9 is not necessarily essential are also involved in production of the cellular molded article of synthetic resin having surface skin 1, 21, 31, or 41.

When the difference of the waveshape between the roughness of the said fine unevenness 9 and the surface roughness of the said thermoplastic resin skin material 3 exceeds both 50 $\mu$m of amplitude and 200 $\mu$m of wavelength and the surface roughness of the said thermoplastic resin skin material 3 is rougher, the roughness of fine unevenness 9d of the said range D becomes finer than the roughness of fine unevenness 9e of the other range E, and appears the beads pattern, which is not preferable. Conversely, when the surface roughness of the said thermoplastic resin skin material 3 is finer, the roughness of the said fine unevenness 9d becomes rougher than the roughness of the said fine unevenness 9e, and appears the beads pattern of the opposite contrast, which is also not preferable.

And as above-mentioned, when the roughness of the said fine unevenness 9 and the surface roughness of the said thermoplastic resin skin material 3 are about the same, these roughness are not particularly limited, these can also be very rough or very fine. The roughness of the case when being very rough corresponds to the above mentioned waveshape exceeding both about 150 $\mu$m of amplitude and about 600 $\mu$m of wavelength. And the roughness of the case when being very fine corresponds to the above-metioned waveshape which is less than about 5 $\mu$m of amplitude, less than about 30 $\mu$m of wavelength. When these values are compared to the surface roughness of the sandpaper or the like, for example, the said case of being very rough corresponds to the case of being rougher than about #100 (No.100), the said case of being very fine corresponds to the case of being finer than about #1000 (No.1000).

That means when the both roughnesses are about the same, any roughness can be permitted. And the case when both the surface 5a of the said one mold part 5 and the surface 3a of the said thermoplastic resin skin material 3 are formed to approximate smoothness and the roughness of the said fine unevenness 9,19 are ultra fine is also involved in the case of being very fine.

Next, this invention is further illustrated by the following examples, however, the scope of this invention is not limited to these examples.

EXAMPLE 1

A laminated sheet made of a vinyl chloride resin sheet (thickness: 0.5 mm) with a polypropylene resin extruded foam sheet (thickness: 2.5 mm) was used as the thermoplastic resin skin material, and one of two mold parts composing the molding chamber was set to be the upper mold part and the other mold part was set to be the lower mold part, and vacuum forming of the thermoplastic resin skin material was performed in a manner that one mold part to stick the said vinyl chloride surface onto the surface of the one mold part. And after clamping mold parts, EPERAN PP (trade name, made by KANEGAFUCHI CHEMICAL INDUSTRY Co. Ltd., expansion ratio was 15 times, imparted with 2 kg/cm$^2$ of inner pressure in advance by using air pressure) as expanded beads were charged into the molding chamber.

Next, steam (0.7 kg/cm$^2$·G) was supplied into the molding chamber through vapor holes formed in the said the other mold part, and pre-heating was performed. After the "steaming" of expanded beads for 5 seconds, drain and steam were removed to make the pressure in the molding chamber less than 500 mmHg by using vacuum pump.

Then, steam (3.2 to 3.7 kg/cm$^2$·G) was supplied into the molding chamber again through the said vapor holes, and after main heating by keeping for 3 to 5 seconds, it was cooled by water, and cooled by room air, and then the mold parts were separated to open and the cellular molded synthetic resin having surface skin was obtained.

EXAMPLE 2

The conditions of Example 2 were the same as those of Example 1 except for using a laminated sheet of polyolefin resin sheet (thickness: 0.75 mm) with polypropylene extruded foam sheet (thickness: 2.5 mm) as thermoplastic resin skin material, and without performing "steaming". Under such conditions the cellular molded article of synthetic resin having surface skin was obtained.

EXAMPLE 3

The conditions of Example 3 were the same as those of Example 1 except using EPERAN PP (trade name, made by KANEGAFUCHI CHEMICAL INDUSTRY Co. Ltd., imparted with 2 kg/cm² of inner pressure in advance by using air pressure) whose expansion ratio was 30 times as expanded beads, and supplying steam of pressure 0.5 kg/cm²·G at pre-heating and supplying steam with pressure of 2.4 to 2.8 kg/cm²·G at main heating. Under such conditions the cellular molded article of synthetic resin having surface skin was obtained.

EXAMPLE 4

The conditions of Example 4 were the same as those of Example 3 except using a laminated sheet of polyolefin resin sheet (thickness: 0.75 mm) with a polypropylene resin extruded foam sheet (thickness: 2.5 mm), without performing "steaming". Under such conditions the cellular molded article of synthetic resin having surface skin was obtained.

COMPARATIVE EXAMPLE 1

The conditions of Comparative Example 1 were the same as those of Example 1 except the said one mold part was set to be the lower mold part and the other mold part was set to be the upper mold part. Under such conditions the cellular molded article of synthetic resin having surface skin was obtained.

COMPARATIVE EXAMPLE 2

The conditions of Comparative Example 2 were the same as those of Example 2 except the said one mold part was set to be the lower mold part and the other mold part was set to be the upper mold part. Under such conditions the cellular molded article of synthetic resin was obtained.

COMPARATIVE EXAMPLE 3

The conditions of Comparative Example 3 were the same as those of Example 3 except the said one mold part was set to be the lower mold part and the other mold part was set to be the upper mold part. Under such conditions the cellular molded article of synthetic resin having surface skin was obtained.

COMPARATIVE EXAMPLE 4

The conditions of Comparative Example 4 were the same as those of Example 4 except the said one mold part was set to be the lower mold part and the other mold part was set to be the upper mold part. Under such conditions the cellular molded article of synthetic resin having surface skin was obtained.

As the physical properties of the cellular molded articles of synthetic resin having surface skin obtained in Examples 1 to 4 and Comparative Examples 1 to 4, (a) melt bonding ratio of expanded beads, (b) adhesiveness between the cellular molded article of synthetic resin and the thermoplastic resin skin material were evaluated by the following methods. The results were shown in Table 1.

(a) Melt bonding ratio of expanded beads

Using a knife, a thin cut was made on the surface of the obtained cellular molded article of synthetic resin having surface skin, then the article was bent and broken, and the broken surface state was observed. The proportion of the broken expanded beads area to the whole area was shown in percentage, and ranked by the evaluation standard shown below.

[Evaluation standard]
A: Melt bonding ratio of expanded beads is not less than 60%
B: Melt bonding ratio of expanded beads is 40 to 59%
C: Melt bonding ratio of expanded beads is 20 to 39%
D: Melt bonding ratio of expanded beads is not more than 19%

(b) Adhesiveness between cellular molded article of synthetic resin and thermoplastic resin skin material The thermoplastic resin skin material and the cellular molded article of synthetic resin composed in the obtained cellular molded article of synthetic resin having surface skin were peeled off, and the interfaced state was observed, and ranked by the evaluation standard shown below.

[Evaluation standard]
A: Only material break in the layer of cellular molded article of synthetic resin is observed.
B: Both material break in the cellular molded article of synthetic resin layer and peeling off at the interface of the cellular molded article of synthetic resin layer and thermoplastic resin skin material are observed.
C: Peeling off at the interface of the cellular molded article of synthetic resin layer and the thermoplastic resin skin material is observed.
D: The cellular molded article of synthetic resin layer and thermoplastic resin skin material are not adhered therewith.

TABLE 1

Physical properties of the cellular molded article of synthetic resin having surface skin

| | Melt bonding ratio of expanded beads | Adhesiveness between the cellular molded article of synthetic resin and the thermoplastic resin skin material |
|---|---|---|
| Example 1 | A | A |
| Example 2 | A | A |
| Example 3 | A | A |
| Example 4 | A | A |
| Comparative Example 1 | B to D | C to D |
| Comparative Example 2 | B to D | C to D |
| Comparative Example 3 | B to D | C to D |
| Comparative Example 4 | B to D | C to D |

EXAMPLE 5

One of the two mold parts which is composing the molding chamber was made to be a female type and the other mold part was made to be a male type. The porous sintering metal was used for the said one mold part to make gas permeable holes of air, and fine unevenness was formed in advance on its surface by chemical etching treatment. The surface roughness of this fine unevenness had a waveshape in the range of 20 to 30 μm of amplitude, 150 to 200 μm of wavelength measured by touching needle type surface roughness measuring instrument (made by TOKYO SEIMITSU Co., trade name: SAFUKOMU 570A, touching needle tip by 5 μmR).

Polyolefinic thermoplastic resin sheet (TPO sheet) was used as the thermoplastic resin skin material, and after heating and softening, the sheet was set on the said one mold part, and formed by vacuum pump.

EPERAN PP (made by KANEGAFUCHI CHEMICAL INDUSTRY Co. Ltd., trade name, expansion ratio was 15 times, imparted with 2 kg/cm² of inner pressure by air pressure in a pressure vessel in advance) was used as the expanded beads, and after clamping the mold parts, these expanded beads were charged into the molding chamber.

Next, steam (steam pressure 1.5 kg/cm$^2$·G) was supplied into the molding chamber through vapor holes formed in the said the other mold part, and pre-heating was performed. After performing "steaming" of expanded beads, drain and steam were removed by vacuum pump.

Then, steam (steam pressure 3.2 to 3.7 kg/cm$^2$·G) was supplied into the molding chamber again through the said vapor holes, and after main heating, cooled by water, the mold parts were separated to open and the cellular molded article of synthetic resin having surface skin was obtained.

EXAMPLE 6

Unevenness for product design pattern was formed in advance by chemical etching treatment on the surface of the said one mold part, then, fine unevenness was formed as same as in Example 1. Other conditions of Example 6 were the same as those of Example 5 except using this mold part, and the cellular molded article of synthetic resin having surface skin was obtained.

EXAMPLE 7

The conditions of Example 7 were the same as those of Example 5 except setting the thermoplastic resin skin material formed to fit the said one mold part in advance, and the cellular molded article of synthetic resin having surface skin was obtained.

EXAMPLE 8

The conditions of Example 8 were the same as those of Example 5 except steam heating was performed from the said one mold part side along with supplying steam (steam pressure 3.2 to 3.7 kg/cm$^2$·G) through vapor holes in the said the other mold part at main heating, and the cellular molded article of synthetic resin having surface skin was obtained.

EXAMPLE 9

The conditions of Example 9 were the same as those of Example 5 except sandpaper of #600 (No.600) whose surface was formed to fine unevenness was used as an unevenness printing item material, and this sandpaper was stuck to the surface of the said one mold part in advance, and the cellular molded article of synthetic resin having surface skin was obtained. And the surface roughness of fine unevenness of sandpaper had a waveshape which was 10 to 30 $\mu$m of amplitude, 100 to 200 $\mu$m of wavelength measured by the said touching needle type surface roughness measuring instrument. And a plurality of fine gas permeable holes which were not more than about 0.2 mm were made on the sandpaper in advance.

EXAMPLE 10

The conditions of Example 10 were the same as those of Example 5 except fine unevenness were formed on the surface of the said one mold part by blast processing (#120, shot pressure of 10 kg/cm$^2$), and the cellular molded article of synthetic resin having surface skin was obtained. And the surface roughness of the fine unevenness by the said blast processing had a waveshape which was 10 to 20 $\mu$m of amplitude, 80 to 200 $\mu$m of wavelength measured by the said touching needle type surface roughness measuring instrument.

EXAMPLE 11

Expanded beads used in this example were the same EPERAN PP (made by KANEGAFUCHI CHEMICAL INDUSTRY Co. Ltd., trade name, expansion ratio was 15 times, imparted with 2 kg/cm$^2$ of inner pressure by air pressure in the pressure vessel in advance) as those used in Example 5, and by cellular molding, the cellular molded article of synthetic resin of a prescribed shape was formed in advance. And thermoplastic resin skin material used in this example was the same polyolefinic thermoplastic resin sheet (TPO sheet) as same as those used in Example 5, and an adhesive was applied to one surface of this sheet in advance.

One mold part whose surface was formed to fine unevenness of the same surface roughness as that of Example 5 in advance by chemical etching treatment was made to be the upper mold part and the other mold part to be the lower mold part. And the said cellular molded article of synthetic resin was set on the other mold part, and after heating and softening thermoplastic resin skin material, and then the thermoplastic resin skin material was set on the cellular molded article of synthetic resin to make of which adhesive applied surface to contact with the cellular molded article of synthetic resin.

Next, while heating the said one mold part, the mold parts were clamped, and pressurized by 2 kg/cm$^2$ of pressurizing force, and the cellular molded article of synthetic resin was obtained.

COMPARATIVE EXAMPLE 5

The conditions of Comparative example 5 were the same as those of Example 5 except the surface of the said one mold part was smoothed without forming fine unevenness, and the cellular molded article of synthetic resin having surface skin was obtained.

COMPARATIVE EXAMPLE 6

The conditions of Comparative example 6 were the same as those of Example 11 except the surface of the said one mold part was smoothed without forming fine unevenness, and the cellular molded article of synthetic resin having surface skin was obtained.

The surface appearance of the cellular molded article of synthetic resin having surface skin obtained by Examples 5 to 11 and Comparative examples 5 to 6 were observed, and ranked by the following evaluation standard. The results were shown in Table 2.

[Evaluation Standard]

○: The beads pattern did not appear on the surface of thermoplastic resin skin material.

X: The beads pattern appeared on the surface of thermoplastic resin skin material.

TABLE 2

|  | The surface appearance of the cellular molded article of synthetic resin having surface skin |
|---|---|
| Example 5 | ○ |
| Example 6 | ○ |
| Example 7 | ○ |
| Example 8 | ○ |
| Example 9 | ○ |
| Example 10 | ○ |
| Example 11 | ○ |
| Comparative example 5 | X |
| Comparative example 6 | X |

EXAMPLE 12

The conditions of Example 12 were the same as those of Example 5 except the surface roughness of the said fine unevenness had a waveshape which was 20 to 30 μm of amplitude, 150 to 250 μm of wavelength measured by the said touching needle type surface roughness measuring instrument, and polyolefinic thermoplastic resin skin material sheet TPO sheet) which was formed in advance to fit the surface shape of the said one mold part was set on the said one mold part, the cellular molded article of synthetic resin having surface skin was obtained.

Therein the surface roughness of the said thermoplastic resin skin material had a waveshape which was 10 to 30 μm of amplitude, 100 to 300 μm of wavelength measured by the said touching needle type surface roughness measuring instrument. The difference of the said waveshape between the roughness of the said fine unevenness and the surface roughness of this thermoplastic resin skin material was 20 μm of amplitude, 150 μm of wavelength.

EXAMPLE 13

Unevenness for product design pattern was formed on the surface of the said one mold part in the same way as Example 6, then fine unevenness was formed in the same way as Example 12. Other conditions of Example 13 were the same as those of Example 12 except using this mold part, and the cellular molded article of synthetic resin having surface skin was obtained.

EXAMPLE 14

The conditions were the same as those of Example 12 except steam was supplied into the molded chamber through vapor holes of the said the other mold part in the same way as Example 8 at the main heating and steam heating was performed from the said one mold part side, and the cellular molded article of synthetic resin having surface skin was obtained.

EXAMPLE 15

The conditions of Example 15 were the same as those of Example 12 except sandpaper of #600 (No.600) which was the same as that of Example 9 was used as unevenness printing item material, and stuck to the surface of the said one mold part in advance, and the cellular molded article of synthetic resin having surface skin was obtained.

And the difference of the said waveshape between the roughness of fine unevenness of the said sandpaper and the surface roughness of the said thermoplastic resin skin material was 20 μm of amplitude, 200 μm of wavelength.

EXAMPLE 16

EPERAN PP (made by KANEGAFUCHI CHEMICAL INDUSTRY Co. Ltd., trade name, expansion ratio was 15 times, imparted with 2 kg/cm$^2$ of inner pressure by air pressure in the pressure vessel in advance) which was the same as that of Example 12 was used as expanded beads, and by cellular molding, cellular molded article of synthetic resin of a prescribed shape was formed in advance. And polyolefinic thermoplastic resin sheet (TPO sheet) which was the same as those of Example 12 was used as the thermoplastic resin skin material, and adhesive was applied to the one surface of the sheet in advance.

In two mold parts, one mold part whose surface was formed in advance to fine unevenness of the same roughness as that of Example 12 by chemical etching treatment was set to be the upper mold part and the other mold part to be the lower mold part, and other conditions were the same as those of Example 11, and the cellular molded article of synthetic resin having surface skin was obtained.

EXAMPLE 17

A polyolefinic thermoplastic resin sheet (TPO sheet) which was the same as that of Example 12 was set on the lower side of the heat press machine, and pressurized by 2 kg/cm$^2$ of pressurizing force for 50 seconds while heating to 150° C., as a result, the surface of the thermoplastic resin skin material was approximately smoothed.

And the surface roughness of this thermoplastic resin skin material had a waveshape which was 0.1 to 0.5 μm of amplitude, 10 to 30 μm of wavelength measured by the said touching needle type surface roughness measuring instrument.

A mold part whose surface was approximately smoothed was used as the said one mold part.

And the surface roughness of this mold part had the waveshape which was 0.1 to 0.3 μm of amplitude, 2 to 10 μm of wavelength. That means, the difference of the said waveshape between the surface roughness of this one mold part and the surface roughness of the said thermoplastic resin skin material was 0.4 μm of amplitude, 28 μm in wavlength.

Other conditions were the same as those of Example 12 except using the said thermoplastic resin skin material whose surface was approximately smoothed and one mold part whose surface was approximately smoothed as abovementioned, and the cellular molded article of synthetic resin having surface skin was obtained.

COMPARATIVE EXAMPLE 7

The conditions of Comparative example 7 was the same as those of Example 12 except using one mold part whose surface was approximately smoothed in the same way as Example 17, and the cellular molded article of synthetic resin having surface skin was obtained.

COMPARATIVE EXAMPLE 8

The conditions of Comparative example 8 were the same as those of Example 12 except using the same thermoplastic resin skin material whose surface was nearly smoothed as that used in Example 17, and the cellular molded article of synthetic resin having surface skin was obtained.

COMPARATIVE EXAMPLE 9

The conditions of Comparative example 9 were the same as those of Example 16 except using the same one mold part whose surface was nearly smoothed as that used in Example 17, and the cellular molded article of synthetic resin having surface skin was obtained.

COMPARATIVE EXAMPLE 10

The conditions of Comparative example 10 were the same as those of Example 16 except using the same thermoplastic resin skin material whose surface was nearly smoothed as used in Example 17, and the cellular molded article of synthetic resin having surface skin was obtained.

The surface appearances of the cellular molded articles of synthetic resin having surface skin obtained in Example 12 to 17, Comparative example 7 to 10 were observed, and ranked by the said evaluation standard. The results were shown in table 3.

TABLE 3

| | The surface appearance of the cellular molded article of the synthetic resin having surface skin |
|---|---|
| Example 12 | ◯ |
| Example 13 | ◯ |
| Example 14 | ◯ |
| Example 15 | ◯ |
| Example 16 | ◯ |
| Example 17 | ◯ |
| Comparative example 7 | X |
| Comparative example 8 | X |
| Comparative example 9 | X |
| Comparative example 10 | X |

POTENTIAL FOR INDUSTRIAL APPLICATION

Method for producing cellular molded article in mold pattern of synthetic resin having surface skin and mold pattern producing thereof of this invention are suitable for use as a method for producing automobile interior material or the like and mold pattern producing thereof, especially suitable for use to produce automobile interior material or the like which has good production efficiency and comprises of cellular molded article of synthetic resin obtained by cellular molding of expanded beads in which poor melt bonding does not occur and thermoplastic resin skin material united with this cellular molded article of synthetic resin which has excellent appearance without residing beads pattern on its surface.

What is claimed is:

1. A method for producing a cellular molded article of a synthetic resin having a surface skin which comprises that in a method for producing the cellular molded article of a synthetic resin having a surface skin in which thermoplastic resin skin material formed in this molding chamber is set in any one of two mold parts which comprises the molding chamber and after clamping the parts, expanded beads are charged into this molding chamber, then expanded and melt bonded together by steam heating, along with being melt bonded and united with the said thermoplastic resin skin material, at least the part of the said one mold part on which the said thermoplastic resin skin material is set is made of gas permeable metal mold, gas permeable ceramic mold or gas permeable electron casted mold having fine gas permeable holes of not more than 100 $\mu$m of diameter on the whole surface and the said one part is made to be the upper mold part and the other part is made to be the lower mold part at least during the said steam heating and before expanding the said expanded beads.

2. A method for producing a cellular molded article of a synthetic resin having a surface skin which comprises that in a method for producing the cellular molded article of the synthetic resin having a surface skin in which thermoplastic resin is set in any one of two mold parts which comprises the molding chamber, and after clamping the parts, expanded beads are charged into this molding chamber and then expanded and melt bonded together by steam heating, along with being melt bonded and united with the said thermoplastic resin skin material, a fine unevenness having 5 to 150 $\mu$m of amplitude, 30 to 600 $\mu$m of wavelength of the surface roughness waveshape is formed in advance on the surface of the said one mold part, and when melt bonding the said expanded beads together along with melt bonding and uniting these expanded beads with the said thermoplastic resin skin material, by printing the said fine unevenness surface to make the surface roughness of a prescribed range of the thermoplastic resin skin material and by the expanding force of the said expanded beads to press hard the thermoplastic resin skin material onto one of the mold parts, the surface roughness of a prescribed range of the thermoplastic resin skin is made to be approximately the same surface roughness of the other range, and the surface roughness of this thermoplastic resin surface skin material is kept nearly uniform.

3. A method for producing a cellular molded article of a synthetic resin having a surface skin which comprises that in a method for producing the cellular molded article of the synthetic resin having a surface skin in which a thermoplastic resin skin material is set in any one of two mold parts which comprises the molding chamber, and after clamping them, expanded beads are charged into this molding chamber, then expanded and melt bonded together by steam heating, along with being melt and united with the said thermoplastic resin skin material, an uneven printing item material is attached to the surface of one of the said mold parts in advance, and when melt bonding the said expanded beads together along with melt bonding and uniting these expanded beads with the said thermoplastic resin skin material are carried out, by printing a fine unevenness having 5 to 150 $\mu$m of amplitude, 30 to 600 $\mu$m of wavelength of the surface roughness waveshape which is formed on the surface of the said uneven printing item material to make the surface roughness of a prescribed range of the thermoplastic resin skin material, which is pressed harder to the surface of the uneven printing item material with an expanding force of the said expanded beads, and the surface roughness of the other range is to be approximately the same on the surface of the thermoplastic resin skin material, the surface roughness of this thermoplastic resin skin material is nearly kept in a constant level.

4. A method for producing a cellular molded article of a synthetic resin having a surface skin which comprises that in a method for producing the cellular molded article of the synthetic resin having a surface skin in which cellular molded article of the synthetic resin and a thermoplastic resin skin material are set between two mold parts and when clamping the parts and pressurizing them, these cellular molded article of the synthetic resin and thermoplastic resin skin material are united by heat and/or an adhesive, a fine unevenness having 5 to 150 $\mu$m of amplitude, 30 to 600 $\mu$m of wavelength of the surface roughness waveshape is formed in advance on the surface of the one mold part which will come in contact with the said thermoplastic resin skin material, and when uniting the said cellular molded article of the synthetic resin with the thermoplastic resin skin material is carried out, by printing the said fine unevenness onto the surface of this thermoplastic resin skin material, the prescribed range of surface roughness of the thermoplastic resin skin material which is pressed harder by the pressurizing force is made to be approximately the same surface roughness to the other range, and the surface roughness of this thermoplastic resin skin material is nearly kept in a constant level.

5. A method for producing a cellular molded article of a synthetic resin having a surface skin which comprises that in a method for the producing cellular molded article of the synthetic resin having a surface skin in which the cellular molded article of the synthetic resin and a thermoplastic resin skin material are set between two mold parts, and when clamping the parts and pressurizing them, these cellular molded article of the synthetic resin and the thermoplastic resin skin material are united by heat and/or an adhesive, an uneven printing item material is attached in advance on the surface of the one mold part which will come in contact with the said thermoplastic resin skin material, and when uniting the said cellular molded article of the synthetic resin with the thermoplastic resin skin material, by printing fine unevenness having 5 to 150 μm of amplitude, 30 to 600 μm of wavelength of the surface roughness waveshape which is formed on the surface of the said uneven printing item material to make the surface roughness of a prescribed range of the thermoplastic resin skin material which is pressed harder to the surface of the said uneven printing item material with a pressurizing force, and at a time of uniting the said synthetic resin cellular molded article with the thermoplastic resin skin material, simultaneously by printing the fine unevenness having 5 to 150 μm of amplitude, 30 to 600 μm of wavelength, which are mounted on the surface of the said uneven item material for printing, onto the surface of this thermoplastic resin skin material, and by means that a prescribed surface roughness of the thermoplastic resin skin material which is pressed harder to the surface of the said uneven item material for printing by the pressurized force, the resulting surface roughness is made to be approximately the same to the other range, and thus the surface roughness of this thermoplastic resin surface skin material is nearly kept in a constant level.

6. A method for producing a cellular molded article of a synthetic resin having a surface skin which comprises that in a method for producing the cellular molded article of the synthetic resin having a surface skin in which a thermoplastic resin skin material is set in any one of two mold parts which comprises the molding chamber, after clamping the parts, expanded beads are charged into this molding chamber, and then expanded and melt bonded together by steam heating, along with being melt bonded and united these expanded beads with the said thermoplastic resin skin material, a fine unevenness whose difference from the said thermoplastic resin skin material is not more than 50 μm of amplitude, not more than 200 μm of wavelength of the surface roughness waveshape is formed in advance on the surface of the said one mold part, and when melt bonding these expanded beads together along with melt bonding and uniting these expanded beads with the said thermoplastic resin skin material, by printing the said fine unevenness to make the surface roughness of a prescribed range of the thermoplastic resin skin material which is pressed harder to the surface of the one mold part with an expanding force of the said expanded beads and the surface roughness of the other range to be approximately the same on the surface of the thermoplastic resin skin material, the surface roughness of this thermoplastic resin skin material is nearly kept in a constant level.

7. A method for producing a cellular molded article of a synthetic resin having a surface skin which comprises that in a method for producing the cellular molded article of the synthetic resin having a surface skin in which the cellular molded article of the synthetic resin and a thermoplastic resin skin material are set between two mold parts, and when clamping the parts and pressurizing them, these cellular molded article of the synthetic resin and the thermoplastic resin skin material are united by heat and/or an adhesive, a fine unevenness whose difference from the said thermoplastic resin skin material is not more than 50 μm of amplitude and not more than 200 μm of wavelength of the surface roughness waveshape is formed in advance on the surface of the one mold part which will come in contact with the said thermoplastic resin skin material, and when uniting the said cellular molded article of the synthetic resin with the thermoplastic resin skin material, by printing the said fine unevenness to make the surface roughness of a prescribed range of the thermoplastic resin skin material which is pressed harder to the surface of the said one mold part with a pressurizing force and the surface roughness of the other range to be approximately the same on the surface of the thermoplastic resin skin material, the surface roughness of this thermoplastic resin skin material is nearly kept in a constant level.

8. A method for producing a cellular molded article of a synthetic resin having a surface skin of claim 3 or 5 wherein in addition to the said fine unevenness, an unevenness for the product design pattern is formed in advance on the surface of the said unevenness printing item material and when printing the said fine unevenness on the surface of the said thermoplastic resin skin material, the said unevenness for product design pattern is also printed.

9. A method for producing a cellular molded article of a synthetic resin having a surface skin of claim 2, 4, 6 or 7 wherein the unevenness for product design pattern in addition to the said fine unevenness is formed in advance on the surface of the said one mold part, and the said unevenness for product design pattern as well as the said fine unevenness is printed on the surface of the said thermoplastic resin skin material.

10. A method for producing a cellular molded article of a synthetic resin having a surface skin of claim 2, 3, 4, 5, 6 or 7 wherein the unevenness for product design pattern is formed in advance on the surface of the said thermoplastic resin skin material before setting the thermoplastic resin material.

11. A mold used for producing a cellular molded article of a synthetic resin having a surface skin which comprises that in a mold used for producing the cellular molded article of the synthetic resin having a surface skin by a method in which a thermoplastic resin skin material is set in any one of two mold parts which comprises the molding chamber, and after clamping the parts, expanded beads are charged in this molding chamber, then expanded and melt bonded together by steam heating, along with being melt bonded and united with the said thermoplastic resin skin material, fine unevenness having 5 to 150 μm of amplitude, 30 to 600 μm of wavelength of the surface roughness waveshape is formed on the surface of printing item material for making the unevenness which is attached on one mold part, or the said unevenness is formed on the surface of the said one mold part by adhering the printing particles for making the unevenness on this surface.

12. A mold used for producing a cellular molded article of a synthetic resin having a surface skin which comprises that in a mold for producing the cellular molded article of the synthetic resin having a surface skin by a method in which the cellular molded article of the synthetic resin and a thermoplastic resin skin material are set between two mold parts, and when clamping the parts and pressurizing them, these cellular molded article of the synthetic resin and the thermoplastic resin skin material are united by heat and/or an adhesive, fine unevenness having 5 to 150 μm of amplitude, 30 to 600 μm of wavelength is formed on the surface of printing item material for making the unevenness which is attached on one mold part to come in contact with the thermoplastic resin skin material, or the said unevenness is formed on the surface of the said one mold part by adhering the printing particles for making the unevenness on this surface.

13. A mold used for producing a cellular molded article of a synthetic resin having a surface skin which comprises that in a mold used for producing the cellular molded article of the synthetic resin having a surface skin by a method in which a thermoplastic resin skin material is set in any one of two mold parts which comprises the molding chamber, and after clamping the parts, expanded beads are charged into this molding chamber, then expanded and melt bonded together by steam heating, along with being melt bonded and united with the said thermoplastic resin skin material, fine unevenness whose difference from the said thermoplastic resin skin material is not more than 50 μm of amplitude and not more than 200 μm of wavelength of the surface roughness waveshape is formed on the surface of printing item material for making the unevenness which is attached on one mold part, or the said unevenness is formed on the surface of the said one mold part by adhering the printing particles for making the unevenness on this surface.

14. A mold used for producing a cellular molded article of a synthetic resin having a surface skin which comprises that in a mold for producing the cellular molded article of the synthetic resin having a surface skin by a method in which the cellular molded article of the synthetic resin and a thermoplastic resin skin material are set between two mold parts, and when clamping the parts and pressurizing them, these cellular molded article of the synthetic resin and the thermoplastic resin skin material are united by heat and/or an adhesive, fine unevenness whose difference from the said thermoplastic resin skin material is not more than 50 μm of amplitude and not more than 200 μm of wavelength of the surface roughness waveshape is formed in advance on the surface of printing item material for making the unevenness which is attached on one mold part to come in contact with the said thermoplastic resin skin material, or the said unevenness is formed on the surface of the said one mold part by adhering the printing particles for making the unevenness on this surface.

15. A mold used for prducing a cellular molded article of a synthetic resin of any of claim 11, 12, 13 or 14 wherein an unevenness for product design pattern in addition to the said fine unevenness is formed.

\* \* \* \* \*